US012205297B2

(12) United States Patent
Zhi et al.

(10) Patent No.: US 12,205,297 B2
(45) Date of Patent: Jan. 21, 2025

(54) SCENE REPRESENTATION USING IMAGE PROCESSING

(71) Applicant: IMPERIAL COLLEGE OF SCIENCE, TECHNOLOGY AND MEDICINE, London (GB)

(72) Inventors: Shuaifeng Zhi, London (GB); Michael Bloesch, London (GB); Stefan Leutenegger, Munich (DE); Andrew Davison, London (GB)

(73) Assignee: Imperial College Innovations Limited, London (GB)

( * ) Notice: Subject to any disclaimer, the term of this patent is extended or adjusted under 35 U.S.C. 154(b) by 609 days.

(21) Appl. No.: 17/407,073

(22) Filed: Aug. 19, 2021

(65) Prior Publication Data

US 2021/0382497 A1 Dec. 9, 2021

Related U.S. Application Data

(63) Continuation of application No. PCT/GB2020/050381, filed on Feb. 18, 2020.

(30) Foreign Application Priority Data

Feb. 26, 2019 (GB) ..................................... 1902600

(51) Int. Cl.
*G06T 7/174* (2017.01)
*G05D 1/00* (2024.01)
(Continued)

(52) U.S. Cl.
CPC ........... *G06T 7/174* (2017.01); *G05D 1/0219* (2013.01); *G05D 1/0251* (2013.01); *G06T 7/11* (2017.01);
(Continued)

(58) Field of Classification Search
CPC ... G06T 7/174; G06T 7/11; G06T 7/55; G06T 7/73; G06T 2207/10016;
(Continued)

(56) References Cited

U.S. PATENT DOCUMENTS

2019/0156504 A1* 5/2019 Jiang ....................... G06T 7/596
2020/0042656 A1* 2/2020 Zapolsky ............... G06V 20/10

FOREIGN PATENT DOCUMENTS

CN 105989586 A 10/2016
CN 107063258 A 8/2017
(Continued)

OTHER PUBLICATIONS

Giannone et al., "Learning Common Representation from RGB and Depth Images", 2018, CVPR Workshop paper, the Computer Vision Foundation, pp. 1-8 (Year: 2018).*
(Continued)

*Primary Examiner* — Chan S Park
*Assistant Examiner* — Daniel C Chang
(74) *Attorney, Agent, or Firm* — EIP US LLP

(57) ABSTRACT

Certain examples described herein relate to a system for processing image data. In such examples, the system includes an input interface to receive the image data, which is representative of at least one view of a scene. The system also includes an initialisation engine to generate a first latent representation associated with a first segmentation of at least a first view of the scene, wherein the first segmentation is a semantic segmentation. The initialisation engine is also arranged to generate a second latent representation associated with at least a second view of the scene. The system additionally includes an optimisation engine to jointly optimise the first latent representation and the second latent
(Continued)

representation, in a latent space, to obtain an optimised first latent representation and an optimised second latent representation.

20 Claims, 13 Drawing Sheets

(51) Int. Cl.
  *G06T 7/11* (2017.01)
  *G06T 7/55* (2017.01)
  *G06T 7/73* (2017.01)
  *G06V 10/26* (2022.01)
  *G06V 10/82* (2022.01)
  *G06V 20/20* (2022.01)
(52) U.S. Cl.
  CPC .................. *G06T 7/55* (2017.01); *G06T 7/73* (2017.01); *G06V 10/26* (2022.01); *G06V 10/82* (2022.01); *G06V 20/20* (2022.01)
(58) Field of Classification Search
  CPC . G06T 2207/20081; G06T 2207/20084; G06T 7/10; G06T 9/00; G06T 19/00; G05D 1/0219; G05D 1/0251; G06V 10/26; G06V 10/82; G06V 20/20; G06V 20/64; G06N 3/045; G06N 3/047; G06N 3/08
  See application file for complete search history.

(56) References Cited

FOREIGN PATENT DOCUMENTS

CN        107480603 A    12/2017
WO        2017220966 A1  12/2017

OTHER PUBLICATIONS

International Search Report and Written Opinion dated May 4, 2020 for International PCT Application No. PCT/GB2020/050381.
United Kingdom Combined Search and Examination report dated Aug. 23, 2019 for United Kingdom Application No. GB 1902600.4.
Giannone et al., "Learning Common Representation from RGB and Depth Images", Arxiv.Org, Cornell University Library, 201 Olin Library Cornell University, Dec. 17, 2018 (Dec. 17, 2018), XPO80993910.
Ma et al., "Multi-View Deep Learning for Consistent Semantic Mapping with RGB-D Cameras", Arxiv.Org, Cornell University Library, 201 Olin Library Cornell University, Mar. 26, 2017 (Mar. 26, 2017), XP080759771.
Stekovic et al., "S4-Net: Geometry-Consistent Semi-Supervised Semantic Segmentation", Arxiv.Org, Cornell University Library, 201 Olin Library Cornell University Ithaca, NY 14853 Dec. 27, 2018 (Dec. 27, 2018), XP081018962.
Bloesch et al., "CodeSLAM—Learning a Compact, Optimisable Representation for Dense Visual SLAM", 2018 IEEE/CVF Conference On Computer Vision And Pattern Recognition, IEEE, Jun. 18, 2018, pp. 2560-2568, XP033476222, DOI: 10.1109/CVPR.2018.00271.
Zhi et al., "SceneCode: Monocular Dense Semantic Reconstruction using Learned Encoded Scene Representations", arxiv.org/abs/1903.06482 Mar. 15, 2019 (Mar. 15, 2019).
He et al., "Deep Residual Learning for Image Recognition" 2016 IEEE Conference on Computer Vision and Pattern Recognition (CVPR), Jun. 27, 2016.
Deng et al., "ImageNet: A Large-Scale Hierarchical Image Database" Proceedings / CVPR, IEEE Computer Society Conference on Computer Vision and Pattern Recognition. IEEE Computer Society Conference on Computer Vision and Pattern Recognition, Jun. 20, 2009.
Lin et al., "RefineNet: Multi-Path Refinement Networks for High-Resolution Semantic Segmentation", Jul. 21, 2017, Proceedings of the IEEE Conference on Computer Vision and Pattern Recognition (CVPR), 2017.
Kingma et al., "Auto-Encoding Variational Bayes", Apr. 14, 2014, Proceedings of the International Conference on earning Representations (ICLR), 2014.
Simonyan et al., "Very Deep Convolutional Networks for Large-Scale Image Recognition", May 7, 2015, published as a conference paper at ICLR 2015.
Ronneberger et al., U-net: Convolutional networks for biomedical image segmentation, May 18, 2015.
McCormac et al, "Fusion++: Volumetric object-level SLAM", published as part of the International Conference on 3D Vision, Sep. 25, 2018.
McCormac et al., "SemanticFusion: Dense 3D Semantic Mapping with Convolutional Neural Networks", May 29, 2017.
Kohl et al., "A Probabilistic U-Net for Segmentation of Ambiguous Images", Dec. 2, 2018.

* cited by examiner

SCENE REPRESENTATION USING IMAGE PROCESSING

CROSS-REFERENCE TO RELATED APPLICATIONS

This application is a continuation of International Application No. PCT/GB2020/050381, filed Feb. 18, 2020 which claims priority to United Kingdom Application No. GB 1902600.4, filed Feb. 26, 2019, under 35 U.S.C. § 119(a). Each of the above-referenced patent applications is incorporated by reference in its entirety.

BACKGROUND

Field of the Invention

The present invention relates to methods and systems for obtaining a representation of a scene using image processing. The invention has particular, but not exclusive, relevance to obtaining a latent representation of the scene, which may for example be used by a robotic device to navigate and/or interact with its environment.

Description of the Related Technology

In the field of computer vision and robotics, there is often a need to construct a representation of an environment, such as a three-dimensional space that is navigable using a robotic device. Constructing a representation of a three-dimensional space allows a real-world environment to be mapped to a virtual or digital realm, where a map of the environment may be used and manipulated by electronic devices. For example, a moveable robotic device may require a representation of a three-dimensional space to allow simultaneous localisation and mapping (often referred to as "SLAM"), and thus navigation of its environment. The robotic device may operate in an indoor domestic or commercial environment or an outdoor natural environment. A representation of an environment may enable models of objects within that space to be identified and/or extracted. These may be used to perform measurements on a real-world environment and/or used to produce three-dimensional replications, e.g. via additive manufacturing systems. Similarly, detection of parts of the human body in a three-dimensional space may enable novel man-machine interactions, enabling virtual representations of objects to be manipulated using actions in the physical world.

There are several techniques available for constructing a representation of an environment. For example, structure from motion and multi-view stereo are two techniques that may be used to do this. Many techniques extract features from images of the environment, which are then correlated from image to image to build a three-dimensional representation. Certain techniques that use a reduced number of points or features to generate a representation are referred to as "sparse" techniques. For example, these techniques may use ten to a hundred features and/or points to generate the representation. These may be contrasted with "dense" techniques that generate representations with many thousands or millions of points. "Sparse" techniques have an advantage that they are easier to implement in real-time, e.g. at a frame rate of 30 frames-per-second or so; using a limited number of points or features limits the extent of the processing that is required to construct the three-dimensional representation. Comparatively it is more difficult to perform real-time "dense" mapping of an environment due to computational requirements. For example, it is often preferred to carry out a "dense" mapping off-line, e.g. it may take 10 hours to generate a "dense" representation from 30 minutes of provided image data.

Once a three-dimensional (3D) representation of a space has been generated there is then a further problem of the utility of the representation. For example, many robotics applications not only need a definition of the geometry of the space but also require useful information regarding what is present in the space. This is referred to in computer vision fields as "semantic" knowledge of the space. Knowing what is present within a space is a process that happens subconsciously in the human brain; as such it is easy to underestimate the difficulty of constructing a machine with equivalent abilities. For example, when human beings observe an object such as a cup in a 3D space, many different areas of the brain are activated in additional to core visual processing networks including those relating to proprioception (e.g. movement towards the object) and language processing. However, many computer vision systems have a very naïve understanding of a space, these systems only "know" the geometry of the space.

In the field of computer vision and robotics, the inclusion of rich semantic information within a representation of a space would enable a much greater range of functionality than geometry alone. For example, in domestic robotics a simple fetching task requires knowledge of both what something is, as well as where it is located. Similarly, the ability to query semantic information within a representation is useful for humans directly, e.g. providing a database for answering spoken queries about the semantics of a previously-generated representation: "How many chairs do we have in the conference room? What is the distance between the lectern and its nearest chair?"

The paper "SemanticFusion: Dense 3D Semantic Mapping with Convolutional Neural Networks" by McCormac et al., published in the Proceedings of the IEEE International Conference on Robotics and Automation (ICRA) in 2017 describes the use of system including a Convolutional Neural Network (CNN) and a SLAM system. The CNN receives a 2D image (e.g. a frame of a video) and returns a set of per-pixel class probabilities. The SLAM system produces a globally consistent map of surface elements (which may be referred to as "surfels" and which allow the geometry of a space to be modelled using surfaces defined within a 3D co-ordinate system). In addition, the SLAM system provides long-term dense correspondence between frames of the video, even during "loopy" motion that views portions of a scene from multiple different locations and/or orientations as opposed to simple limited rotation of a camera. These correspondences allow the CNN's semantic predictions from multiple viewpoints to be probabilistically fused with the map of surface elements to produce a semantic 3D map. Such a method is relatively computationally intensive and may suffer from inaccuracies or inconsistencies in object labelling.

At the other end of the scale are approaches which explicitly recognise object instances and build scene models as 3D object graphs. The paper "Fusion++: Volumetric Object-Level SLAM" by McCormac et al., presented at the 2018 International Conference on 3D Vision describes an object-level SLAM system which builds a persistent 3D graph map of arbitrary reconstructed objects. Such an approach may, however, leave large fractions of a scene undescribed. Hence, approaches such as this may be less suitable for navigation of or interaction with an environment.

Given existing techniques, there is still a desire for efficient representations of scenes, which provide information on what is visible in a scene. For example, such a representation may give artificial systems the capability to reason about space and shape in an intuitive manner akin to that of humans.

SUMMARY

According to a first aspect of the present invention, there is provided a system for processing image data, the system comprising: an input interface to receive the image data, wherein the image data is representative of at least one view of a scene; an initialisation engine to generate: a first latent representation associated with a first segmentation of at least a first view of the scene, wherein the first segmentation is a semantic segmentation; and a second latent representation associated with at least a second view of the scene; and an optimisation engine to jointly optimise the first latent representation and the second latent representation, in a latent space, to obtain an optimised first latent representation and an optimised second latent representation.

In certain examples, the system comprises a decoder system to at least one of: decode the optimised first latent representation to obtain a decoded first representation of the first view of the scene, wherein an optimised first segmentation of the first view of the scene is derivable from the decoded first representation; and decode the optimised second latent representation to obtain a decoded second representation of the second view of the scene, wherein an optimised second segmentation of the second view of the scene is derivable from the decoded second representation. In these examples, the system may include a feature identification engine to identify image features of the image data, wherein the decoder system comprises at least one decoder conditioned on the image features. In these examples, the feature identification engine may be arranged to identify image features at each of a plurality of different resolutions, and a decoder of the at least one decoder may be arranged to: produce a decoded output at each of the plurality of different resolutions; and, for each of the plurality of different resolutions, combine the image features for a given resolution with the decoded output for the given resolution.

In certain examples in which the system includes a decoder system, the decoder system may be arranged to at least one of: normalise the decoded first representation to obtain the optimised first segmentation; and normalise the decoded second representation to obtain the optimised second segmentation.

In certain examples in which the system includes a decoder system, the system may further include a tracking system to determine poses of a camera during observation of the scene; and a mapping system arranged to populate a map of the scene with at least one of: the optimised first segmentation of the first view of the scene and first pose data representative of a first pose of a camera during capture of the first view of the scene; and the optimised second segmentation of the second view of the scene and second pose data representative of the pose of the camera during capture of the second view of the scene.

In certain examples, the image data comprises a first frame representing the first view of the scene and a second frame representing the second view of the scene, the first segmentation is a semantic segmentation of the first view of the scene, and the second latent representation is associated with a second segmentation which is a semantic segmentation of the second view of the scene. In these examples, the optimisation engine may be arranged to jointly optimise the first latent representation and the second latent representation by: determining a semantic error term indicative of a difference between the first latent representation and the second latent representation; and determining a value of the first latent representation and a value of the second latent representation that minimises the semantic error term. In such examples, the system may further comprise a decoder system arranged to: decode the first latent representation to obtain a decoded first representation; and decode the second latent representation to obtain a decoded second representation, wherein the optimisation engine is arranged to determine the semantic error term using the decoded first representation and the decoded second representation. The decoder system may be trained on pairs of input image data and ground-truth semantic segmentations. In these examples, the initialisation engine may be arranged to generate: a third latent representation associated with a depth map of the first view of the scene; and a fourth latent representation associated with a depth map of the second view of the scene, wherein the optimisation engine is arranged to jointly optimise the first, second, third and fourth latent representations in the latent space to obtain the optimised first and second latent representations and optimised third and fourth latent representations. The optimisation engine may be arranged to jointly optimise the first, second, third and fourth latent representations by: determining a semantic error term indicative of a difference between the first latent representation and the second latent representation; determining a geometric error term indicative of a difference between the third latent representation and the fourth latent representation; and determining values of the first, second, third and fourth latent representations, respectively, that jointly minimise the semantic error term and the geometric error term to obtain optimised first, second, third and fourth latent representations. In these examples, the system may include a decoder system comprising: a first decoder arranged to at least one of: decode the optimised first latent representation to obtain an optimised semantic segmentation of the first view of the scene; and decode the optimised second latent representation to obtain an optimised semantic segmentation of the second view of the scene; and a second decoder arranged to at least one of: decode the optimised third latent representation to obtain an optimised depth map of the first view of the scene; and decode the optimised fourth latent representation to obtain an optimised depth map of the second view of the scene. The optimisation engine may be arranged to: determine a photometric error term indicative of a photo-consistency between the first view of the scene and the second view of the scene; and determine respective values of at least one of the first, second, third and fourth latent representations that minimise the photometric error term.

In certain examples, the first segmentation is the semantic segmentation of the first view of the scene, and the second latent representation is associated with a depth map for the second view of the scene.

In certain examples, at least one of the first latent representation and the second latent representation is a predetermined representation.

According to a second aspect of the present invention there is provided a robotic device comprising: the system according to any one of the above examples; one or more actuators to enable the robotic device to interact with a surrounding three-dimensional environment, wherein at least a portion of the surrounding three-dimensional environment is shown in the scene; and an interaction engine comprising at least one processor to control the one or more actuators.

According to a third aspect of the present invention there is provided a method of processing image data, the method comprising: obtaining a first latent representation associated with a first segmentation of a first view of a scene represented by the image data, wherein the first segmentation is a semantic segmentation; obtaining a second latent representation associated with a second view of the scene; and jointly optimising the first latent representation and the second latent representation in a latent space to obtain an optimised first latent representation and an optimised second latent representation.

In certain examples, the image data comprises a first frame representing the first view of a scene and a second frame representing the second view of the scene, the first segmentation is a semantic segmentation of the first view of the scene, and the second latent representation is associated with a second segmentation which is a semantic segmentation of the second view of the scene. In these examples, the method may include obtaining a third latent representation associated with depth data for the scene; obtaining a fourth latent representation associated with depth data for the scene; and jointly optimising the first, second, third and fourth latent representations in the latent space to obtain the optimised first and second latent representations and an optimised third and fourth representation.

According to a fourth aspect of the present invention there is provided a method of training a latent representation prediction engine to predict a semantic segmentation of an input image, the method comprising: detecting image features of an image; encoding a ground-truth semantic segmentation of the image using an encoder of an autoencoder to obtain a latent representation of the ground-truth semantic segmentation; decoding the latent representation of the ground-truth semantic segmentation using a decoder of the autoencoder to obtain a predicted semantic segmentation of the image, wherein the autoencoder is conditioned using the image features; and updating the latent representation prediction engine using a loss function based on a comparison between the predicted semantic segmentation of the image and the ground-truth semantic segmentation of the image.

In certain examples, the decoder is conditioned using the image features; or the encoder is conditioned using the image features and the decoder is conditioned using the image features.

In certain examples, the method comprises training the latent representation prediction engine to predict the semantic segmentation and a depth map associated with the input image. In these examples, the encoder may be a first encoder, the decoder may be a first decoder, the autoencoder may be a first autoencoder, the loss function may be a first loss function and the method may comprise: encoding a ground-truth depth map associated with the image using a second encoder of a second autoencoder to obtain a latent representation of the ground-truth depth map; decoding the latent representation of the ground-truth depth map using a second decoder of the second autoencoder the obtain a predicted depth map for the image, wherein the second autoencoder is conditioned using the image features; and updating the latent representation prediction engine using a second loss function based on a comparison between the predicted depth map and the ground-truth depth map. The second decoder is conditioned using the image features; or the second encoder may be conditioned using the image features and the second decoder is conditioned using the image features.

In certain examples, training the latent representation prediction engine comprises training the encoder and the decoder to perform variational autoencoding of an input semantic segmentation of the input image.

In certain examples, the decoder comprises a linear decoder.

In certain examples, the encoder is arranged to produce an encoded output at each of a plurality of different resolutions, and the method comprises: detecting the image features of the image at each of the plurality of different resolutions; and conditioning the encoder using the image features by, for each of the plurality of different resolutions, combining the image features for a given resolution with the encoded output for the given resolution.

In certain examples, the decoder is arranged to produce a decoded output at each of a plurality of different resolutions, and the method comprises: detecting the image features of the image at each of the plurality of different resolutions; and conditioning the decoder using the image features by, for each of the plurality of different resolutions, combining the image features for a given resolution with the decoded output for the given resolution.

In certain examples, the image is a colour image.

In certain examples, the loss function comprises a regularisation term.

According to a fifth aspect of the present invention there is provided a non-transitory computer-readable storage medium comprising computer-executable instructions which, when executed by a processor, cause a computing device to perform any of the methods described above.

Further features will become apparent from the following description, which is made with reference to the accompanying drawings.

DETAILED DESCRIPTION

Figure 1A:
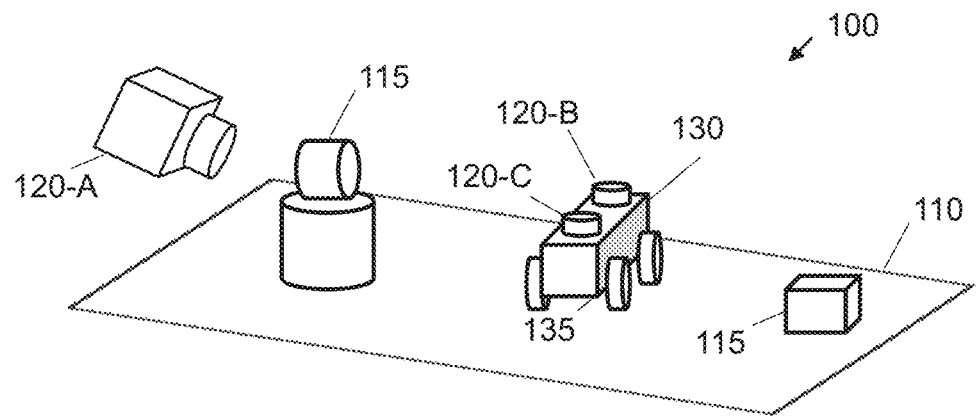
FIG. 1A is a schematic diagram showing an example of an environment to be mapped.

Certain examples described herein enable a latent representation of a scene to be obtained. A latent representation is for example a representation that is inferred from a measurement. A latent representation is sometimes referred to as a "hidden" set of variable values, as they may not be directly measurable from an environment. In this case, the measurement of the scene may be e.g. an image of a scene, which may be a two-dimensional (2D) colour image, such as an RGB (red, green, blue) image, or an image including depth information, such as an RGB-D image (which includes depth, "D", data). Typically, a latent representation is more compact, for example with a lower dimensionality, than a direct measurement. Hence, such latent representations may be processed and stored more efficiently. A latent representation may for example be generated using a probabilistic model or one or more "hidden" layers of a neural network architecture.

In certain cases, examples described herein may be used to obtain a semantic segmentation of a scene from a latent representation of the scene. A semantic segmentation may be considered to be an object segmentation, e.g. a labelling of image portions, where each label includes an association with a particular object or class of objects. An object may refer to any visible thing or entity with a material presence, e.g. that a robot may interact with. Hence, an object here is considered broadly and includes, amongst many others, entities such as walls, doors, floors and people as well as furniture, other devices, and conventional objects in a home, office and/or exterior space. Using a semantic segmentation, mapping of an environment may be improved, e.g. enabling improved interactions between a robotic device and the environment. For example, if a map for a household robot includes a semantic segmentation, identifying regions of a space that are associated with particular objects, the robot can distinguish a 'door' from a 'wall'.

In some cases, examples described herein may be used to obtain a depth map of a scene from a latent representation of the scene. A depth map for example indicates a depth associated with spatial elements, e.g. pixels or image portions, of an image of the scene. A depth value for a pixel or image portion may represent a distance to a surface in an environment along a line of sight from a camera that is viewing the scene. Mapping of the scene may therefore be improved by using a depth map, which may also enhance or improve interactions between a robotic device and the scene. For example, the robotic device may be controlled, using the depth map, to accurately grasp an object by moving a grasping mechanism of the robotic device to a position within the environment which more closely corresponds to a depth of the object to be grasped.

In certain examples described herein, the latent representation may be an optimised latent representation, which is for example a more refined or otherwise more accurate estimate of the latent representation than an initial estimate of the latent representation. In such cases, a first latent representation associated with a first segmentation of a first view of a scene, and a second latent representation associated with a second view of a scene may be obtained. A segmentation may be considered to refer generally to a labelling of image portions with an appropriate label representative of a characteristic of the given image portion. For example, the first segmentation may be a semantic segmentation, in which image portions are associated with particular objects or classes of objects. The first latent representation and the second latent representation in these examples are jointly optimised in a latent space to obtain an optimised first latent representation and an optimised second latent representation. Jointly optimising the first and second latent representations preserves correlations between the first and second views, and improves consistency of the latent representations. The optimised first and second latent representations may therefore more accurately represent characteristics of the scene. Furthermore, a segmentation or map may be obtained from at least one of the first and second latent representations, which may be more internally consistent. For example, an optimised first segmentation, which is for example a semantic segmentation, may be derived from the optimised first latent representation. A distribution of the semantic labels of the optimised first segmentation may be smoother than otherwise.

As an example, in previous approaches, a semantic label associated with one pixel may be independent of a semantic label associated with a neighbouring pixel. Hence, the use of such previous approaches may lead to a semantic segmentation which varies rapidly and sharply across an image. As an example, if an image is of a table, three neighbouring pixels of the table may each be associated with different respective labels (e.g. "table", "bed", "chair"), despite the fact that each of these pixels should be associated with the same label ("table").

In contrast, jointly optimising first and second latent representations, as in examples described herein, may improve the smoothness of a segmentation (e.g. a semantic segmentation) obtained from an optimised latent representation. For example, with the image of the table, the three neighbouring pixels may each be associated with the same label ("table") using methods herein, due to the correlations preserved by the joint optimisation. In examples, methods described herein may therefore be used to obtain optimised semantic segmentations (e.g. from optimised latent representations) with improved semantic consistency, such that any given part of a scene has the same semantic label irrespective of viewpoint. Different representations may be jointly optimised, such as semantic segmentations and depth maps and/or different frames for one or more of semantic segmentations and depth maps, e.g. jointly optimising over different modalities and/or different times for data representing a view of a scene (e.g. data from correlated or shared camera poses). Interactions between a robotic device and its environment may therefore be improved by using such a segmentation.

Figure 1B:
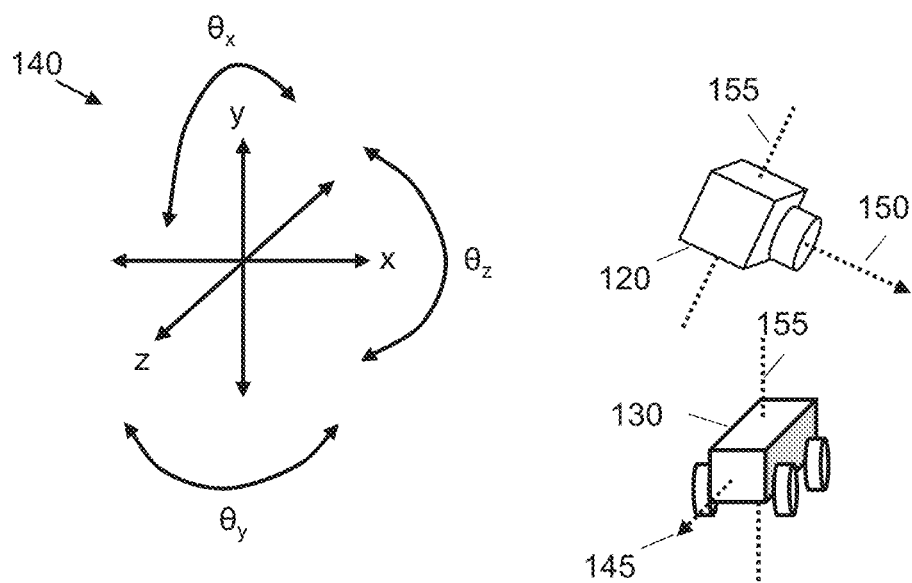
FIG. 1B is a schematic diagram showing available degrees of freedom for example devices.
Figure 1C:
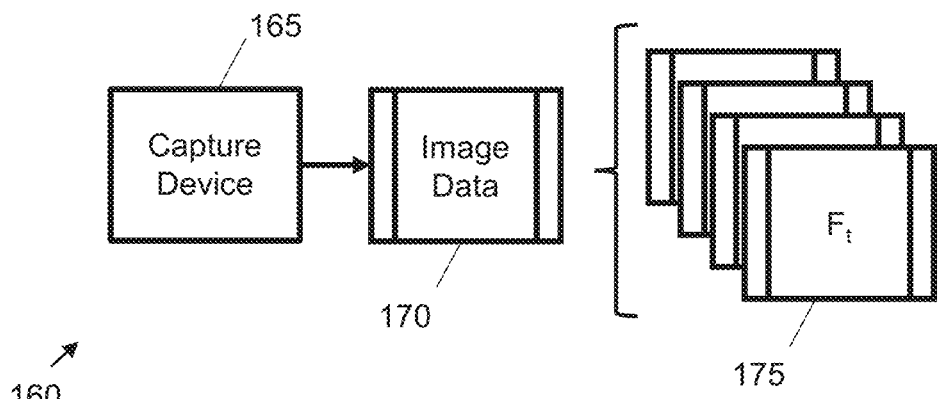
FIG. 1C is a schematic diagram showing video data generated by an example capture device.

FIGS. 1A and 1B schematically show an example of a 3D space and the capture of image data associated with that space. FIG. 1C then shows a capture device configured to generate image data when viewing the space. These examples are presented to better explain certain features described herein and should not be considered limiting; certain features have been omitted and simplified for ease of explanation.

FIG. 1A shows an example 100 of a three-dimensional space 110. The 3D space 110 may be an internal and/or an external physical space, e.g. at least a portion of a room or a geographical location. The 3D space 110 in this example 100 comprises a number of physical objects 115 that are located within the 3D space. These objects 115 may include one or more of, amongst others: people, electronic devices, furniture, animals, building portions and equipment. Although the 3D space 110 in FIG. 1A is shown with a lower surface this need not be the case in all implementations, for example an environment may be aerial or within extra-terrestrial space.

The example 100 also shows various example capture devices 120-A, 120-B, 120-C (collectively referred to with the reference numeral 120) that may be used to capture video data associated with the 3D space 110. A capture device, such as the capture device 120-A of FIG. 1A, may include a camera that is arranged to record data that results from observing the 3D space 110, either in digital or analogue form. For example, the capture device 120-A may be a monocular capture device, such as a monocular camera. A monocular camera typically captures an image of a scene from one position at a time, and may have a single lens or lens system. In contrast, a stereo camera generally includes at least two lenses, with a separate image sensor for each lens. A monocular capture device useable as the capture device 120-A may be a monocular multi-directional camera device, arranged to capture an image of the 3D space 110 from a plurality of angular positions. In use, multiple images may be captured, one after each other. In certain cases, the plurality of angular positions cover a wide field of view. In a particular case, the capture device 120-A may include an omni-directional camera, e.g. a device arranged to capture a field of view of substantially 360 degrees. In this case, the omni-directional camera may include a device with a panoramic-annular lens, e.g. the lens may be mounted in relation to a charge-coupled array.

In order to capture a plurality of images of the 3D space from a plurality of different positions, the capture device 120-A may be moveable. For example, the capture device 120-A may be arranged to capture different frames corresponding to different observed portions of the 3D space 110. The capture device 120-A may be moveable with reference to a static mounting, and e.g. may include actuators to change the position and/or orientation of the camera with regard to the 3D space 110. In another case, the capture device 120-A may be a handheld device operated and moved by a human user. In one case, the capture device 120-A may include a still image device, configured to capture a sequence of images; in another case, the capture device 120-A may include a video device to capture video data including a sequence of images in the form of video frames. For example, the capture device 120-A may be a monocular camera or a monocular capture device to capture or otherwise obtain frames of video data.

In FIG. 1A, multiple capture devices 120-B, C are also shown coupled to a robotic device 130 that is arranged to move within the 3D space 110. The robotic device 130 may include an autonomous aerial and/or terrestrial mobile device. In the present example 100, the robotic device 130 includes actuators 135 that enable the device to navigate the 3D space 110. These actuators 135 include wheels in the illustration; in other cases, they may include tracks, burrowing mechanisms, rotors, etc. One or more capture devices 120-B, C may be statically or moveably mounted on such a device. In certain cases, a robotic device may be statically mounted within the 3D space 110 but a portion of the device, such as arms or other actuators, may be arranged to move within the space and interact with objects within the space. Each capture device 120-B, C may capture a different type of image data, video data and/or may include a stereo image source. In one case, at least one of the capture devices 120-B, C is configured to capture photometric data, e.g. colour or grayscale images. In one case, one or more of the capture devices 120-B, C may be moveable independently of the robotic device 130. In one case, one or more of the capture devices 120-B, C may be mounted upon a rotating mechanism, e.g. that rotates in an angled arc and/or that rotates by 360 degrees, and/or is arranged with adapted optics to capture a panorama of a scene (e.g. up to a full 360 degree panorama). It will be appreciated that, in some cases, a capture device similar to or the same as the capture device 120-A may be used as one or both of the capture devices 120-B, C of FIG. 1A.

FIG. 1B shows an example 140 of degrees of freedom available to a capture device 120 and/or a robotic device 130. In the case of a capture device such as 120-A, a direction 150 of the device may be co-linear with the axis of a lens or other imaging apparatus. As an example of rotation about one of the three axes, a normal axis 155 is shown in the Figures. Similarly, in the case of the robotic device 130, a direction of alignment 145 of the robotic device 130 may be defined. This may indicate a facing of the robotic device and/or a direction of travel. A normal axis 155 is also shown. Although only a single normal axis is shown with reference to the capture device 120 or the robotic device 130, these devices may rotate around any one or more of the axes shown schematically as 140 as described below.

More generally, an orientation and location of a capture device may be defined in three-dimensions with reference to six degrees of freedom (6DOF): a location may be defined within each of the three dimensions, e.g. by an [x, y, z] co-ordinate, and an orientation may be defined by an angle vector representing a rotation about each of the three axes, e.g. [$\theta_x$, $\theta_y$, $\theta_z$]. Location and orientation may be seen as a transformation within three-dimensions, e.g. with respect to an origin defined within a 3D coordinate system. For example, the [x, y, z] co-ordinate may represent a translation from the origin to a particular location within the 3D coordinate system and the angle vector—[$\theta_x$, $\theta_y$, $\theta_z$]—may define a rotation within the 3D coordinate system. A transformation having 6DOF may be defined as a matrix, such that multiplication by the matrix applies the transformation. In certain implementations, a capture device may be defined with reference to a restricted set of these six degrees of freedom, e.g. for a capture device on a ground vehicle the y-dimension may be constant. In certain implementations, such as that of the robotic device 130, an orientation and location of a capture device coupled to another device may be defined with reference to the orientation and location of that other device, e.g. may be defined with reference to the orientation and location of the robotic device 130.

In examples described herein, the orientation and location of a capture device, e.g. as set out in a 6DOF transformation matrix, may be defined as the pose of the capture device. Likewise, the orientation and location of an object representation, e.g. as set out in a 6DOF transformation matrix, may be defined as the pose of the object representation. The pose of a capture device may vary over time, e.g. as video data or a series of still images is recorded, such that a capture device may have a different pose at a time t+1 than at a time t. In a case of a handheld mobile computing device comprising a capture device, the pose may vary as the handheld device is moved by a user within the 3D space 110.

FIG. 1C shows schematically an example of a capture device configuration. In the example 160 of FIG. 1C, a capture device 165 is configured to generate image data 170. In FIG. 1C, the image data 170 includes a plurality of frames 175. Each frame 175 may relate to a particular time t in a time period over which an image of a 3D space, such as 110 in FIG. 1A, is captured (i.e. $F_t$). A frame 175 generally includes a 2D representation of measured data. For example, a frame 175 may include a 2D array or matrix of recorded pixel values at time t. In the example of FIG. 1C, all frames 175 within the image data are the same size, although this need not be the case in all examples. Pixel values within a frame 175 represent a measurement of a particular portion of the 3D space. In FIG. 1C, the image data represents a plurality of views of the scene from a monocular capture device, each of which is captured at a different respective time t. However, in other cases, image data captured by a capture device (or an image or video capture system) may represent a plurality of views of the scene captured at the same or an at least partially overlapping time as each other. This may be the case where the capture device is a stereo capture system.

In the example of FIG. 1C, each frame 175 includes photometric data. Photometric data typically represents photometric characteristics of an image, such as a brightness, intensity or colour. In FIG. 1C, each frame 175 includes the intensity values of each pixel of the frame 175, which may be stored with a greyscale or brightness level of, for example, from 0 to 255 per colour band or colour channel. A greyscale level of 0 for example corresponds with a darkest intensity (e.g. black) and a greyscale level of 255 for example corresponds with a lightest intensity (e.g. white), with greyscale levels between 0 and 255 corresponding with an intermediate intensity between black and white. In FIG. 1C, the photometric data represents Red, Green, Blue pixel intensity values for a given resolution. Hence, each frame 175 represents a colour image, where each [x, y] pixel value in a frame includes an RGB vector [R, G, B]. As an example, the resolution of the colour data may be 640 by 480 pixels. In other examples, other colour spaces may be used and/or the photometric data may represent other photometric characteristics.

The capture device 165 may be arranged to store the image data 170 in a coupled data storage device. In another case, the capture device 165 may transmit the image data 170 to a coupled computing device, e.g. as a stream of data or on a frame-by-frame basis. The coupled computing device may be directly coupled, e.g. via a universal serial bus (USB) connection, or indirectly coupled, e.g. the image data 170 may be transmitted over one or more computer networks. In yet another case, the capture device 165 may be configured to transmit the image data 170 across one or more computer networks for storage in a network attached storage device. The image data 170 may be stored and/or transmitted on a frame-by-frame basis or in a batch basis, e.g. a plurality of frames may be bundled together.

One or more pre-processing operations may also be performed on the image data 170 before it is used in the later-described examples. In one case, pre-processing may be applied such that two frame sets have a common size and resolution.

In some cases, the capture device 165 may be configured to generate video data as the image data. Video data may similarly represent a plurality of frames captured at a different respective time. In one case, video data captured by the capture device 165 may include a compressed video stream or file. In this case, frames of video data may be reconstructed from the stream or file, e.g. as the output of a video decoder. Video data may be retrieved from memory locations following pre-processing of video streams or files.

FIG. 1C is provided as an example and, as will be appreciated, different configurations than those shown in the Figure may be used to generate the image data 170 for use in the methods and systems described below. The image data 170 may further include any measured sensory input that is arranged in a two-dimensional form representative of a captured or recorded view of a 3D space. For example, this may include photometric data, depth data electromagnetic imaging, ultrasonic imaging and radar output, amongst others. In these cases, only an imaging device associated with the particular form of data may be required, e.g. an RGB device without depth data.

Figure 2:
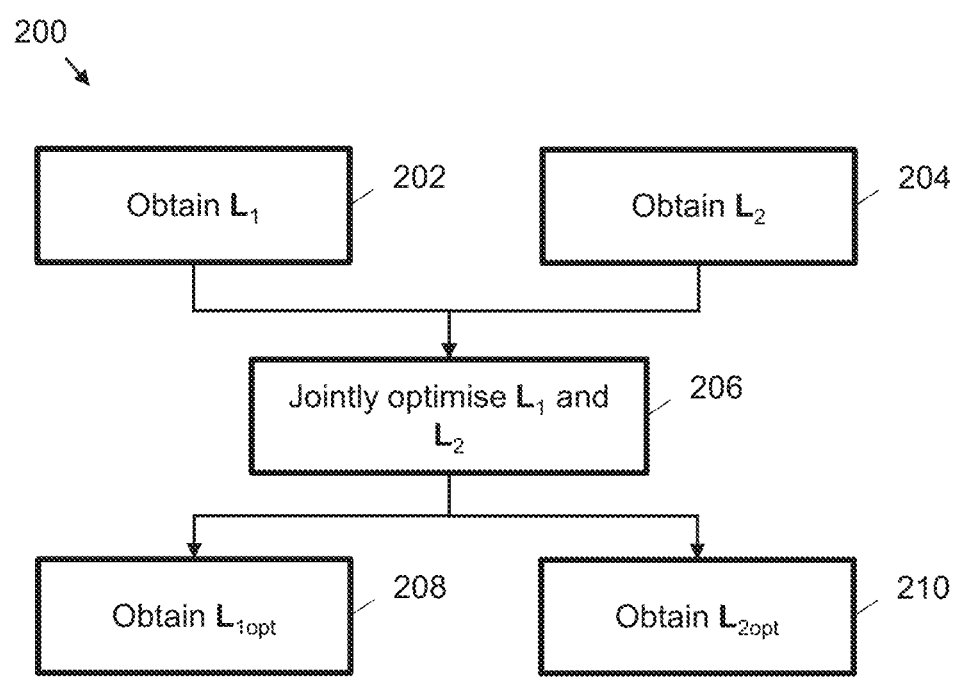
FIG. 2 is a flow diagram showing a method of processing image data according to examples.

FIG. 2 is flow diagram showing a method 200 of processing image data according to examples herein. At item 202 of FIG. 2, a first latent representation, $L_1$, is obtained. The first latent representation is associated with a first segmentation of a first view of a scene represented by the image data. A latent representation may be considered to be associated with a segmentation of a view of scene if the segmentation is derivable from the latent representation, e.g. by processing the latent representation as discussed further with reference to FIG. 3.

In FIG. 2, the first segmentation is a semantic segmentation. The first latent representation may be lower dimensionality, more compact or otherwise representable using fewer parameters than the semantic segmentation. In this way, the first latent representation may represent the semantic segmentation more efficiently, but without sacrificing much (if any) detail. The first latent representation may for example be a code, which is e.g. a series or other arrangement of numbers, letters and/or symbols used to represent the semantic segmentation. As an example, the code may be a tensor, such as vector, of numerical or other values. The first latent representation may have a predetermined or fixed data size. In this way, the size of the first latent representation may be selected to store a sufficient amount of detail to allow the semantic segmentation to be accurately reconstructed, while being sufficiently small to process or store efficiently. An example of obtaining the first latent representation is discussed further with reference to FIG. 3.

At item 204 of FIG. 2, a second latent representation, $L_2$, is obtained. The second latent representation is associated with a second view of the scene. The first and second views may be the same as each other. In other words, a capture device used to capture the image data may not have moved between capture of the first and second views. In other examples, though, the first and second views may be different from each other. The first and second views may nevertheless partly overlap each other, so that at least a portion of the first view is also present in the second view (albeit in a different position). The second latent representation may be associated with the same segmentation as the first latent representation. For example, the second latent representation may be associated with a semantic segmentation of the second view of the scene. In other examples, though, the second latent representation may be associated with a different segmentation or other map than the first latent representation. For example, whereas the first latent representation is associated with a semantic segmentation, the second latent representation may be associated with a depth map.

At item 206 of FIG. 2, the first latent representation and the second latent representation are jointly optimised in a latent space to obtain, at item 208, an optimised first latent representation and, at item 210, an optimised second latent representation. It is to be appreciated that the optimised first and second latent representations may be obtained simultaneously, e.g. at the same time as each other, or one may be obtained before the other. An optimised semantic segmentation of the first view of the scene may be derived from the optimised first latent representation. The optimised first latent representation may, however, be much smaller than the optimised semantic segmentation itself and may therefore be stored and processed more efficiently, while allowing the optimised semantic segmentation to be reproduced.

Jointly optimising the first and second latent representations in the latent space for example refers to an optimisation procedure in which values of the first and second latent representations are iteratively updated to minimise a residual. As it is the values of the first and second latent representations themselves that are iteratively updated, this optimisation may be considered to be in the latent space. In contrast, an optimisation procedure in which the values of other variables are iteratively updated, and the first and second latent representations are subsequently derived from these other variables, may not be considered to be in the latent space. By optimising within the latent space in examples in accordance with FIG. 2, correlations between the first and second latent representations may be included, which may enhance the accuracy with which the optimised first and second latent representations obtained by the optimisation capture details of the scene. This can improve the accuracy with which, e.g. an optimised semantic segmentation derived from the optimised first latent representation represents the semantic content of the scene.

The optimised latent representations may be obtained from the image data itself, which is generally easily accessible in a robotic mapping system, rather than from other data requiring separate capture and storage. For example, the image data may be used during the optimisation procedure. The image data for example represents at least a first view of the scene (which is associated with the first latent representation) and at least a second view of the scene (which is associated with the second latent representation). In such cases, the image data may be used to identify a correspondence between a portion of the first view of the scene and a portion of the second view of the scene. For example, the image data may be used to identify a portion of the second view which corresponds to a given portion of the first view (in other words, which shows the same part of the scene). As corresponding portions of the first and second views are of the same part of the scene, a given characteristic of these portions of the first and second views (e.g. a semantic label or a depth) should be the same. This can be leveraged during the optimisation procedure, which may for example be arranged to identify values of the first and second latent representations that minimise a difference between a characteristic derived from the first latent representation and the same characteristic derived from the second latent representation for portions of the first and second views that are identified as showing the same part of the scene.

Figure 3:
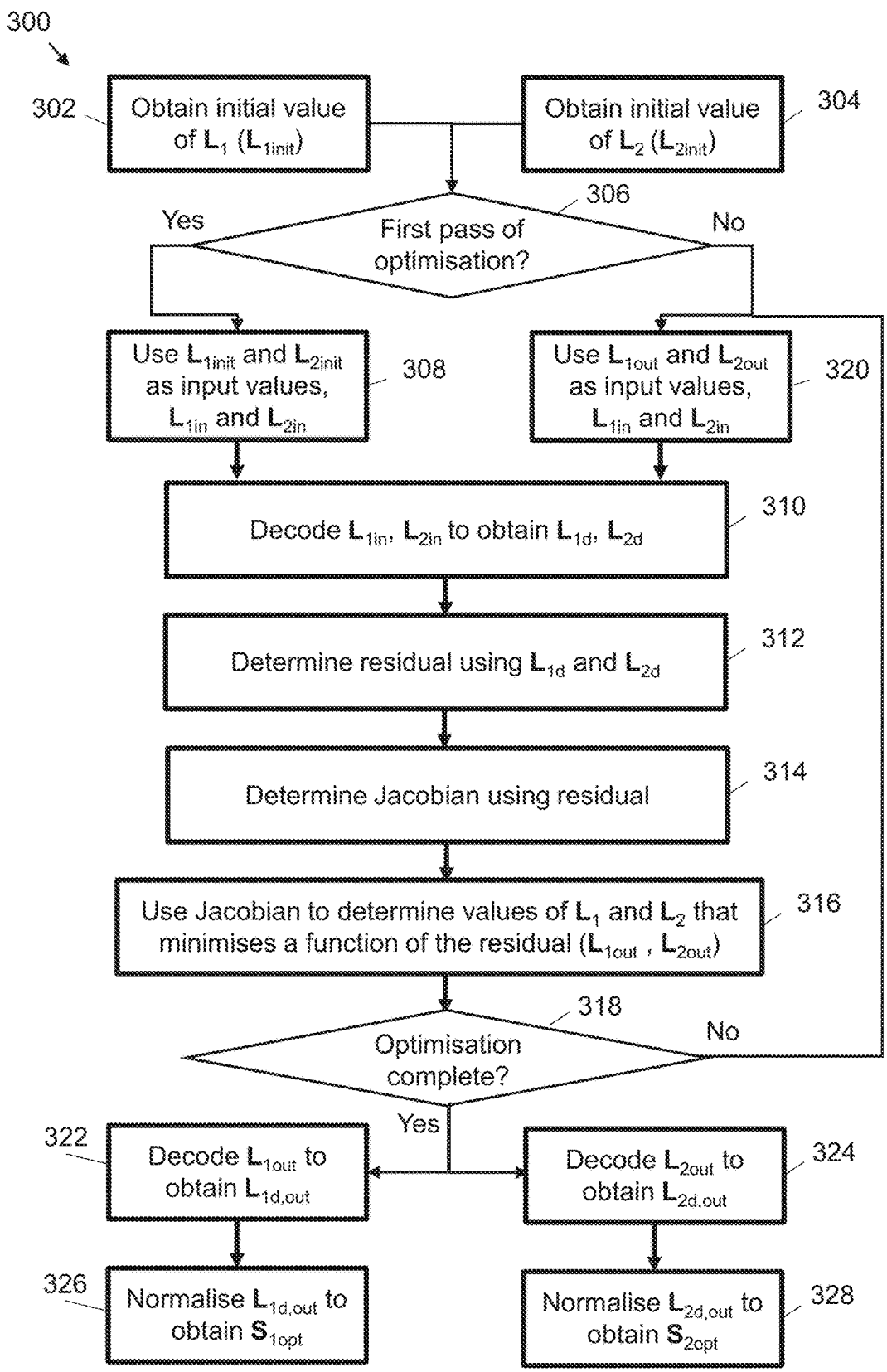
FIG. 3 is a flow diagram showing a method of processing image data according to further examples.

FIG. 3 is flow diagram showing a method 300 of processing image data according to further examples herein. The method 300 of FIG. 3 is similar to the method of FIG. 2. However, the method 300 of FIG. 3 is illustrated in more detail, as an example of how the method 200 of FIG. 2 may be implemented. It is to be appreciated, though, that the method 300 of FIG. 3 is merely one way in which the method 200 of FIG. 2 may be performed, and other methods are possible in other examples.

At item 302, an initial value of a first latent representation, $L_1$, which may be referred to as $L_{1init}$ is obtained. Similarly, at item 304, an initial value of a first latent representation, $L_2$, which may be referred to as $L_{2init}$ is obtained. In this example, the first latent representation is associated with a semantic segmentation of a first view of a scene captured in image data to be processed. As in FIG. 2, the second latent representation is associated with a second view of the scene, and may be a semantic segmentation or a different segmentation or map, such as a depth map.

In examples, at least one of the first latent representation and the second latent representation may be a predetermined representation. For example, the first and/or second latent representations may be a default value, or other predetermined value, such as a zero value. In this way, the predetermined representation may be an initial estimate of the first and/or second latent representations, which is independent of the scene (and of the image data). This initial estimate is subsequently refined by the optimisation procedure of FIG. 3 in this example.

At item 306, a determination is made as to whether it is a first pass of the optimisation procedure. If it is, the initial values of the first and second latent representations are used as inputs, $L_{1in}$, $L_{2in}$, to the optimisation at item 308.

At item 308, the input first and second latent representations, $L_{1in}$, $L_{2in}$, are decoded to obtain decoded first and second latent representations, $L_{1d}$, $L_{2d}$. The input first and second latent representations in this case are decoded using a decoder system trained for use in obtaining a given segmentation or map from an input. For example, the decoder system may include a first decoder trained for use in obtaining a semantic segmentation from a first input latent representation and a second decoder trained for use in obtaining a depth map from a second input latent representation. This is described further with reference to FIG. 4. In such cases, the decoder system may include a normalisation engine to obtain a segmentation or map that is normalised to a predetermined range of values. In these cases, the decoded first and second latent representations may be those obtained prior to normalisation.

Using the decoded first and second latent representations, an optimisation procedure may be performed to identify optimised first and second latent representations. Optimisation may be performed using any optimisation procedure. In the example of FIG. 3, the optimisation procedure involves the use of the Gauss-Newton algorithm, which may be used to solve non-linear least squares problems (although this is merely an example). Given m residuals $r=(r_1, \ldots, r_m)$ of n variables $\beta=(\beta_1, \ldots, \beta_m)$, with m≥n, the Gauss-Newton algorithm may be used to iteratively find the value of the variables that minimises the sum of squares:

$$S(\beta) = \sum_{i=1}^{m} r_i^2(\beta)$$

Values of the variables are iteratively calculated as:

$$\beta^{(s+1)}=\beta^{(s)}-(J_r^T J_r)^{-1} J_r^T r(\beta^{(s)})$$

where T denotes a matrix transpose and J is a Jacobian matrix that may be expressed as:

$$(J_r)_{ij} = \frac{\partial r_i(\beta^{(s)})}{\partial \beta_j}$$

This is shown in FIG. 3. At item 312 of FIG. 3, at least one residual is determined using the decoded first and second latent representations. A residual is for example a measure of a difference between a measured value and a predicted value, and for example corresponds to an error term. Typically, the larger the difference between the measured and predicted values, the larger the residual. Hence, minimisation of a difference between the measured and predicted values (e.g. by minimising the residual or a function based on the residual) may be used to determine optimal parameters of model from which the predicted values may be obtained. As an example, item 312 may involve calculating a residual representative of a difference between the decoded first latent representation and the decoded second latent representation.

As explained with reference to FIG. 3, the image data may include first and second views of a scene. The image data may be used during the optimisation procedure to identify a portion (e.g. a pixel or other spatial element) of the second view of the scene which corresponds to a given portion (which may also be a pixel or other spatial element) of the first view of the scene. In such cases, the residual may be representative of a difference between the decoded first latent representation for a pixel of the first view of the scene and the decoded second latent representation for a pixel of the second view of the scene which is identified as showing the same part of the scene as the pixel of the first view of the scene.

At item 314, at least one Jacobian is determined using the at least one residual, for example using the equation above. Hence, in examples such as this, the residual(s) may be differentiable, such that corresponding Jacobian(s) can be calculated. At item 316, the Jacobian(s) are used to determine values of the first and second latent representations, $L_{1out}$, $L_{2out}$, that minimise a function of the residual (e.g. a sum of squares of residuals in examples in which there is more than one residual). In this way, the first and second latent representations are jointly optimised, in a latent space.

In some cases, one or more Jacobians may be pre-computed to increase the speed with which the value of the Jacobian can be evaluated. For example, the Jacobian(s) may depend on the image represented by the image data, without depending on other features. In such cases, the Jacobian(s) may be computed once per input image, without being recalculated for each iteration of the optimisation procedure. In this way, the pre-computed Jacobian(s) can be repeatedly used in subsequent iterations of the optimisation procedure and may be re-used in later optimisations based on the same input image. For example, the Jacobian(s) may be computed for a keyframe of a video, and then stored for use in future optimisations which involve the same keyframe. A keyframe may be a keyframe as designated by an external system, e.g. an external SLAM system. In other cases, a frame obtained after a capture device observing the scene has moved by a distance exceeding a threshold distance may be a keyframe. At item 318 of FIG. 3, it is determined whether the optimisation is complete. An optimisation may be considered complete for example where a cost function (such as the sum of squares $S(\beta)$ discussed above) meets or is less than a predetermined value, or after a predetermined number of iterations. If the optimisation is incomplete, the method of FIG. 3 involves using the output of a previous iteration, $L_{1out}$, $L_{2out}$, as inputs to a subsequent iteration, $L_{1in}$, $L_{2in}$, as shown at item 320 of FIG. 3. The optimisation proceeds as described above, via items 310, 312, 314, 316 and 318. Further details of example optimisations are described with reference to FIGS. 7, 8 and 9.

If the optimisation is determined to be complete at item 318, the values of the first and second latent representations output by the optimisation process, $L_{1out}$, $L_{2out}$, may be considered to be the optimised first and second latent representations, respectively. In some cases, the optimised first and second latent representations may be stored, e.g. in a storage of a system for performing the method of FIG. 3, or transferred, e.g. for storage elsewhere such as in a storage system with a greater storage capacity. In this way, the optimised first and second latent representations may be retained for subsequent use. In the example of FIG. 3, though, the optimised first latent representation is decoded at item 322 to obtain a decoded first representation of the first view of the scene. The optimised second latent representation is decoded at item 324 to obtain a decoded second representation of the second view of the scene. The optimised first and second latent representations may be decoded by a decoder system, such as a decoder system used at item 310 to decode first and second latent representations input to the optimisation procedure. In the example of FIG. 3, both the optimised first and second latent representations are decoded. However, it is to be appreciated that in, in some cases, decoding of one or both of the optimised first and second latent representations may be omitted.

The decoded first and second representations may be considered to represent observable or measurable characteristics of the scene in a less compact manner than the optimised first and second latent representations. The decoded second representation may be similar to the decoded first representation but representative of the second view of the scene (which may be the same as or different from the first view of the scene), and may be representative of a different characteristic than the decoded first representation. For example, whereas values of the decoded first representation may indicate a semantic content of a portion of the first view of the scene associated with those values, the values of the decoded second representation may indicate a depth of a portion of the second view of the scene associated with those values. However, in other cases, the decoded first and second representations may represent the same characteristic as each other, but for different views of the same scene.

The values of the decoded first and second representations may be unnormalised values. In this way, values of the decoded first and second representations may each be internally consistent, but of different scales than each other. FIG. 3 shows such a case. In the example of FIG. 3, at item 326, the decoded first representation is normalised to obtain an optimised first segmentation, which is for example a semantic segmentation of the first view of the scene. At item 328 of FIG. 3, the decoded second representation is normalised to obtain an optimised second segmentation, which is for example a segmentation of the second view of the scene, such as a semantic segmentation. Normalisation of at least one of the decoded first and second representations may be performed by a decoder system, such as the decoder system used to decode the first and second latent representations during optimisation (which may itself be the decoder system used to decode the optimised first and second latent representations). In the example of FIG. 3, both the decoded first and second representations are normalised. However, it is to be appreciated that in, in some cases, normalisation of one or both of the decoded first and second representations may be omitted.

By normalising the decoded first and second representations, a more meaningful or otherwise intuitive representation may be obtained. For example, the softmax function may be used. The softmax function maps an n-dimensional vector of real values to an n-dimensional vector of real values in the range from 0 to 1. This may be summarised mathematically as:

$$\sigma: \mathbb{R}^K \to \left\{ \sigma \in \mathbb{R}^K \mid \sigma_i > 0, \sum_{i=1}^{K} \sigma_i = 1 \right\}$$

$$\sigma(z)_j = \frac{e^{z_j}}{\sum_{k=1}^{K} e^{z_k}}, j = 1, \ldots, K$$

where a K-dimensional vector of real values is mapped to a K-dimensional vector σ(z) of real values, each in the range of (0, 1), and such that all the values of the vector σ(z) add up to 1. $\mathbb{R}^K$ indicates a set of all real-valued tuples with K-dimensions. However, other normalisation functions may be used in other examples.

As an example, the decoded first representation may be normalised to obtain an optimised semantic segmentation of the first view of the scene. Such a semantic segmentation may be an array of values, each in the range of (0, 1), such that pixels of the first view of the scene have a corresponding semantic segmentation value. In such a case, a particular range of semantic segmentation values may be considered to correspond to a particular class of object (such as a "table"), and a different range may be considered to correspond to a different class of object (such as a "bed"). In this way, the optimised semantic segmentation may be used to identify regions of the first view of the scene which correspond to particular classes of objects (or particular objects).

Figure 4:
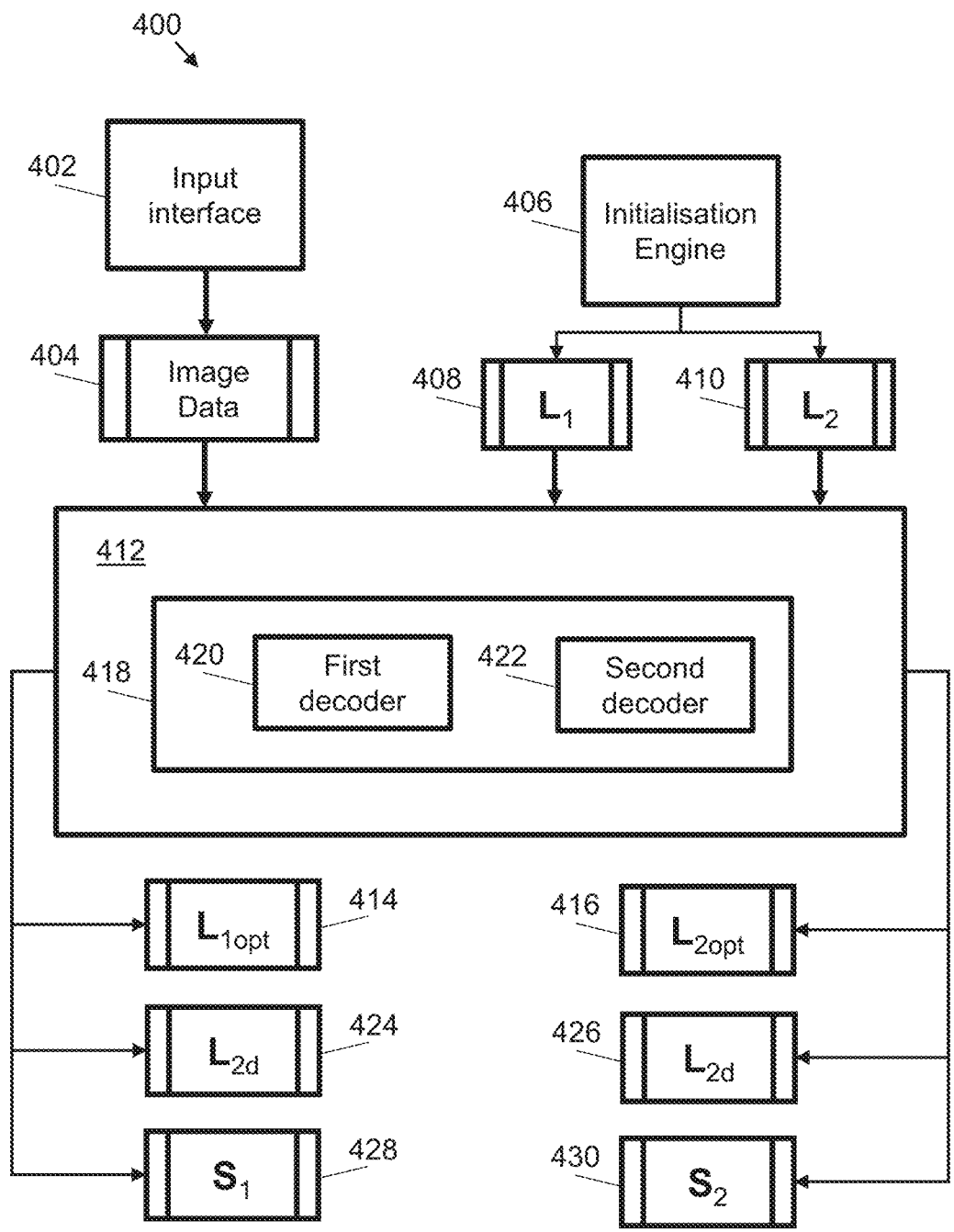
FIG. 4 is a schematic diagram of a system for processing image data according to examples.

FIG. 4 is a schematic diagram of a system 400 for processing image data according to examples, such as the examples of FIGS. 2 and 3. The system 400 includes an input interface 402 for receiving image data 404 and transferring the image data 404 for processing. The image data 404 is representative of at least one view of a scene. The input interface 402 may be an image acquisition interface, which may be coupled to a capture device such as a camera. The image acquisition interface may include a hardware interface, such as a USB or network interface, and computer program code implementing software drivers. In one case, the system 400 may be configured to operate on streaming data, e.g. live video data, which may be received by an image acquisition interface of the system 400. In another case, the system 400 may be communicatively coupled to a camera and be arranged to store the image data 404 received from the camera device in one or more of persistent and non-persistent data storage, e.g. frames of data may be copied into memory and/or may be stored in a hard disk drive or solid state storage. In another case, the image data 404 may be stored externally to the system 400 in a given file format, e.g. in one or more files accessible in a data storage device. In this case, the system 400 may use or implement part of a file system to at least read data from the one or more files. In such cases, the input interface 402 may be any suitable interface to allow the system 400 to receive the image data 404 from the data storage device. The system 400 may include dedicated processing electronics and/or may be implemented by way of computer program code executed by a processor of at least one computing device.

The system 400 may include one or more embedded computing devices. This may include at least one processor operating in association with memory to execute computer program code loaded onto a computer readable medium. This medium may comprise solid state storage such as an erasable-programmable-read-only memory and the computer program code may include firmware. In other cases, the system 400 may include a suitably configured system-on-chip, application-specific integrated circuit and/or one or more suitably programmed field-programmable gate arrays. In one case, the system 400 may be implemented by way of computer program code and/or dedicated processing electronics in a mobile computing device and/or a desktop computing device; in this case, the system 400 may be configured to receive images transmitted from a robotic device and/or to transmit determined latent representations (or segmentations or maps derived from the determined latent representations) back to the robotic device. Other implementations of distributed computing may also be used without deviating from the described examples herein. In one case, the system 400 may be implemented, in whole or in part, as well as or instead of the previous cases, by one or more GPUs executing computer program code. In certain cases, the system 400 may be implemented by way of one or more functions implemented in parallel, e.g. on multiple processors and/or cores of a GPU.

The system 400 of FIG. 4 also includes an initialisation engine 406, which is configured to generate a first latent representation, $L_1$, 408 associated with a first segmentation of at least a first view of a scene captured in the image data 404. The first segmentation is a semantic segmentation in this example. The initialisation engine 406 is also configured to generate a second latent representation, $L_2$, 410 associated with at least a second view of the scene. As explained with reference to FIG. 3, the first and second view may be different from or the same as each other. The second latent representation may represent the same or a different characteristic than the first latent representation. For example, the second latent representation may be associated with a semantic segmentation of at least the second view of the scene, or a depth map of at least the second view of the scene. The term "generate" may be used broadly in this context, to refer to either newly produced first and second latent representations or to refer to first and second latent representations which are retrieved or otherwise obtained by the initialisation engine 406, e.g. from storage of or accessible to the system 400.

The system 400 is arranged to input the image data 404 and the first and second latent representations to an optimisation engine 412, which is arranged to jointly optimise the first latent representation 408 and the second latent representation 410 in a latent space to obtain an optimised first latent representation 414 and an optimised second latent representation 416.

In the example of FIG. 4, the optimisation engine 412 is arranged to implement the optimisation procedure described with reference to FIG. 3 (although this is merely an example and other optimisation procedures are possible). The optimisation engine 412 includes a decoder system 418, which in this example includes a first decoder 420 configured to decode the first latent representation 408 and a second decoder 422 configured to decode the second latent representation 410. In this case, the first and second latent representations 408, 410 are decoded during optimisation, as explained with reference to item 310 of FIG. 3.

In FIG. 4, the first decoder 420 has been trained on pairs of input image data and ground-truth semantic segmentations to decode a first latent representation of a semantic segmentation to obtain the semantic segmentation itself. The first decoder 420 is for example a decoder of an autoencoder trained using the pairs of input image data and ground-truth semantic segmentations, as discussed further with reference to FIGS. 12 to 14.

The second decoder 422 in the example of FIG. 4 has been trained on pairs of input image data and ground-truth segmentations or maps corresponding to a characteristic the second latent representation is intended to represent. For example, the second decoder 422 may have been trained on pairs of input image data and ground-truth depth maps to decode a second latent representation of a depth map to obtain the depth map itself. The second decoder 422 may also be a decoder of an autoencoder, which is typically a different autoencoder than that the first decoder 420 may form part of.

It is to be appreciated that, in some cases, the first and second latent representations may each represent a semantic segmentation (of the first and second views of the scene, respectively). In such cases, the decoder system 418 may not include a second decoder 422. The first and second latent representations in these cases may both be decoded by the same decoder (e.g. the first decoder 420).

The first decoder 420 may be trained to output a predetermined latent representation as a most likely latent representation. For example, the first decoder 420 may be trained to output a zero code as the most likely latent representation of a semantic segmentation. This behaviour of the first decoder 420 may be imposed by training the first decoder 420 using a multivariate Gaussian prior centred on zero. With the first decoder 420 trained in this way, the initialisation engine 406 may be arranged to generate a predetermined representation as the first latent representation, which is for example the most likely latent representation. For example, the initialisation engine 406 may be arranged to generate a zero latent representation as the first latent representation. The second decoder 422 may be trained similarly. Hence, the initialisation engine 406 may also or instead be arranged to generate a predetermined representation as the second latent representation, which is for example the most likely latent representation, e.g. a zero latent representation.

In addition to outputting the optimised first and second latent representations 414, 416, the optimisation engine 412 is also arranged to output decoded first and second representations 424, 426 and optimised first and second segmentations 428, 430, for example as described with reference to items 322, 324, 326, 328 of FIG. 3. It is to be appreciated that, in some cases, at least one of the optimised first and second latent representations 414, 416, the decoded first and second representations 424, 426 and the optimised first and second segmentations 428, 430 may not be output by the optimisation engine 412, or may be output at a different time than others. Furthermore, in some cases, the decoder system 418 may not form part of the optimisation engine 412, but may instead be a separate or otherwise different component that the optimisation engine 412 can nevertheless communicate with or transfer data between.

Figure 5:
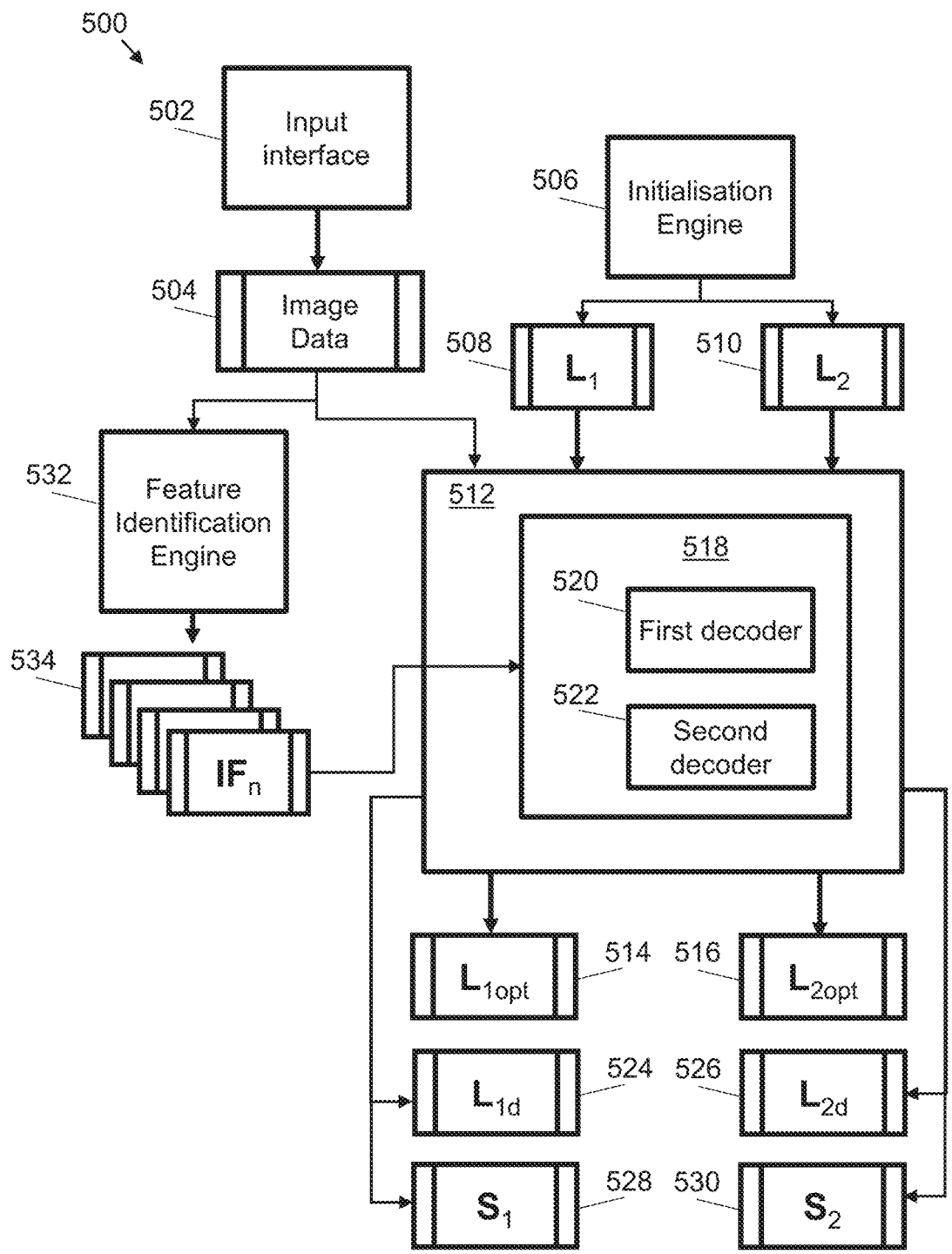
FIG. 5 is a schematic diagram of a system for processing image data according to further examples.

FIG. 5 is a schematic diagram of a system 500 for processing image data 504 according to further examples. Features of FIG. 5 which are similar to corresponding to features of FIG. 4 are labelled with the same reference numeral but incremented by 100. Corresponding descriptions are to be taken to apply.

The system 500 of FIG. 5 is the same as the system 400 of FIG. 4, except that it additionally includes a feature identification engine 532 which is arranged to identify image features 534 of the image data 504. The feature identification engine 532 may be any engine which allows image features 534, such as corners, edges, shapes, colours etc., to be identified. For example, the feature identification engine 532 may be implemented as a neural network architecture, which may be implemented in software, hardware or a combination of software and hardware. Such a neural network architecture may be a convolutional neural network (CNN), such as a fully convolutional network. In an example, the feature identification engine 532 includes a so-called "U-Net", which is an example of a fully convolutional network. A U-Net architecture is described in the 2015 paper "U-Net: Convolutional networks for biomedical image segmentation" by Ronneberger et al (incorporated by reference where applicable).

In the example of FIG. 5, the decoder system 512 is conditioned on the image features 534. One or both of the first decoder 520 and the second decoder 522 may be conditioned on the image features 534.

Figure 6:
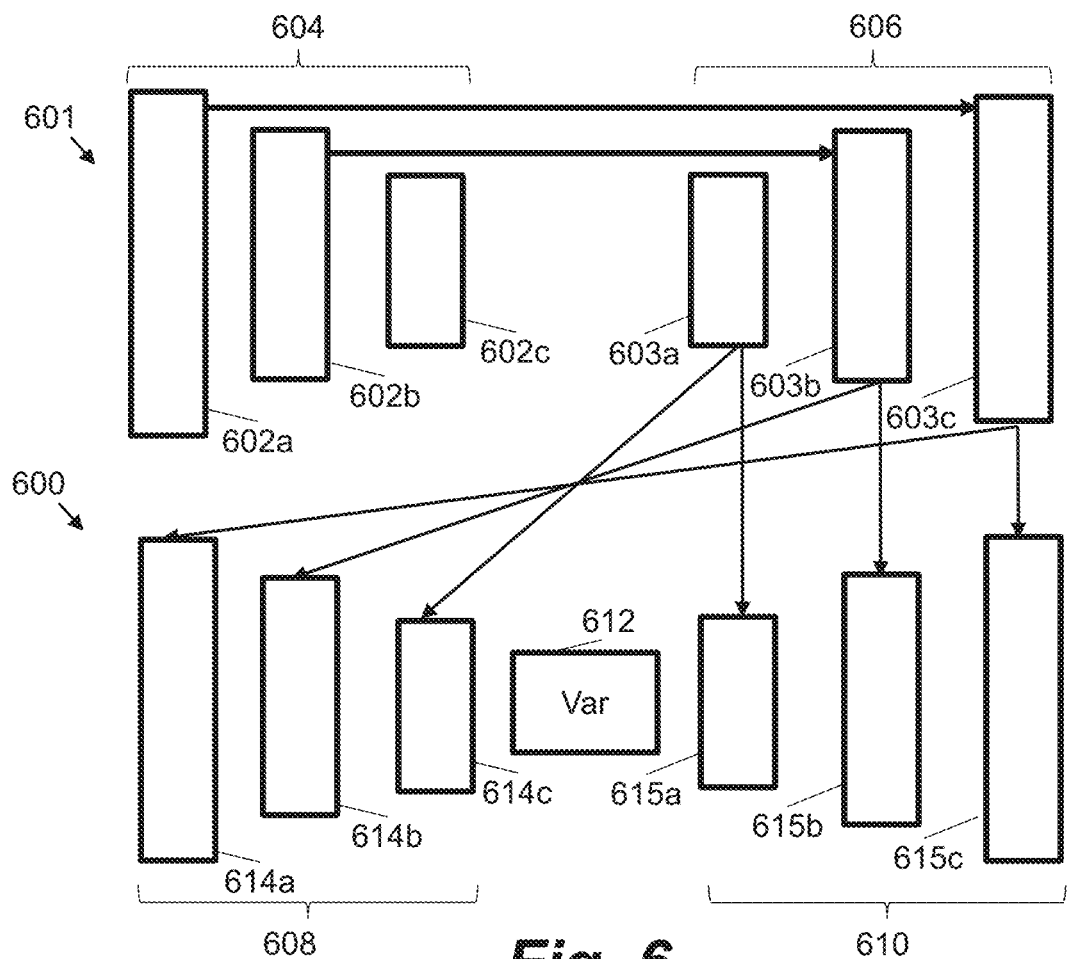
FIG. 6 is a schematic diagram of an autoencoder conditioned on image features according to examples.

FIG. 6 is a schematic diagram of an autoencoder 600 conditioned on image features according to examples. An autoencoder may be considered to be conditioned on image features where at least one of an encoder or a decoder is conditioned on the image features. For example, in some cases, a decoder of an autoencoder may be conditioned on image features without an encoder of the autoencoder being conditioned on the image features.

In FIG. 6, the image features are obtained using a U-Net 601, which is arranged to decompose an input image into convolutional features. The U-Net 601 includes a contracting path, indicated schematically with the reference numeral 604 (sometimes referred to as a downsampling path). In FIG. 6, the contracting path 604 includes a set of downsampling blocks 602a-602c, which are each arranged to obtain image features with a given resolution. Each downsampling block may include a convolution, followed by a rectified linear unit (ReLU) and a max pooling operation. During the contracting path 604, the spatial information is reduced. However, the feature information is increased, e.g. by increasing the number of feature maps at each stage. In this way, a representation of the image with increasing coarseness but an increasing dimensionality of the image features may be obtained.

The U-Net 601 also includes an expanding path 606, which is sometimes referred to as an upsampling path. In FIG. 6, the expanding path 606 includes a set of upsampling blocks 603a-603c. Each upsampling block for example combines feature and spatial information obtained by the contracting path 604, e.g. using an up-convolution and concatenation (indicated by the arrows between 602a and 603a, 602b and 603b, and 602c and 603c in FIG. 6). In this way, the upsampling blocks 603a-603c are arranged to obtain image features at a plurality of different resolutions.

The image features obtained by the upsampling blocks 603a-603c in FIG. 6 are used to condition the autoencoder 600. An autoencoder is for example an artificial neural network which is trained to learn an identity mapping, while being subject to a bottleneck to force the autoencoder to learn a compact representation of the data to be autoencoded. For example, the autoencoder 600 may be trained to learn a compact representation (which may be referred to herein as a latent representation) of a semantic segmentation of an image. The autoencoder 600 includes an encoder 608 and a decoder 610. A decoder such as the decoder 610 of FIG. 6 may be used as at least one of the first decoder 520 and the second decoder 522 of FIG. 5.

In the example of FIG. 6, the autoencoder 600 is a conditional variational autoencoder, with a variational part 612. The use of a variational autoencoder can increase the smoothness of a mapping between a latent representation and a segmentation (e.g. a semantic segmentation) derivable from the latent representation (e.g. by decoding the latent representation using the autoencoder). In such cases, small changes in the latent representation tend to result in small changes in the segmentation output by the autoencoder.

The encoder 608 includes a series of encoding components including a set of encoding blocks 614a-614c to encode data received, e.g. a ground-truth segmentation the autoencoder 600 is to be trained to autoencode. The encoder 608 may also include a first component arranged to perform convolutional and subsampling of the input data, e.g. prior to the encoding blocks 614a-614c. The encoding blocks 614a-614c may be considered to implement a downsampling operation. Downsampling may be achieved by varying a stride of a series of convolutions between filters (sometimes referred to as kernels) associated with a given stage of the encoder 608 and the input to the encoder 608. The encoder 608 may a convolutional neural network, e.g. a fully convolutional recognition model, for example based on the convolutional network described in the paper "Very Deep Convolutional Networks for Large-Scale Image Recognition" by K. Simonyan and A. Zisserman, published as a conference paper at ICLR 2015 (incorporated by reference where applicable).

In this case, the encoder 608 forms part of a variational autoencoder 600 rather than a vanilla encoder. Hence, the encoder 608 in this case is trained to output a mean and an uncertainty of the characteristic the encoder 608 has been trained to encode. In examples, the encoder 608 may be trained using an input segmentation or map with a plurality of spatial elements. For example, the encoder 608 may be trained using a ground-truth semantic segmentation, with an array of pixels corresponding to pixels of an input image. However, the pixels of the ground-truth semantic segmentation may include semantic values (e.g. a value indicative of or otherwise representative of a semantic label associated with the corresponding pixel of the input image), rather than photometric values. In such cases, the encoder 608 for example outputs a mean semantic value and an uncertainty associated with the mean semantic value (or a vector of means and associated uncertainties) for each of the pixels of the ground-truth semantic segmentation, rather than directly outputting a latent representation of the semantic segmentation for a given pixel. In these cases, the variational part 612 samples from a distribution with a mean corresponding to the mean semantic value and an uncertainty corresponding to the uncertainty associated with the mean semantic value to obtain the latent representation for a particular pixel. The distribution is for example a Gaussian distribution. This may be considered to correspond to sampling from a latent space associated with the characteristic the autoencoder 600 is trained to autoencode.

The latent representation obtained by the variational part 612, which is for example a reduced dimensionality encoding of the input data, can then be decoded by the decoder 610 to obtain an estimated reconstruction of the data input to the encoder 608 (e.g. a semantic segmentation or depth map). The decoder 610 includes a set of decoding blocks 615a-615c. The decoder 610 may be considered to implement an upsampling operation. Upsampling may be achieved using bilinear interpolation or deconvolution, for example. During decoding, the decoder 610 outputs a plurality of feature maps (which may for example be considered to correspond to a respective decoded output), at a plurality of different resolutions. For example, each decoding block 615a-615c may output a decoded output at a different respective resolution. In the example of FIG. 6, the resolution of the decoded outputs generated by the decoding blocks 615a-615c decreases from the decoding block 615a to the decoding block 615c. An output of the decoder 610 is for example a decoded latent representation, which may be normalised e.g. as discussed with reference to items 326 and 328 of FIG. 3.

In FIG. 6, the encoder 608 and the decoder 610 are conditioned using the image features obtained by upsampling blocks 603a-603c of the U-Net 601 (which is an example of a feature identification engine). However, in other cases, the decoder 610 is conditioned using the image features, without the encoder 608 being conditioned using the image features (or vice versa). The image features are at a plurality of resolutions. In this case, the image features obtained by the feature identification engine (in this case, by the upsampling blocks 603a-603c) are used to condition the encoder 608 and the decoder 610. The encoder 608 in this case produces an encoded output (e.g. feature maps) at each of a plurality of different resolutions. For each of the plurality of different resolutions, the encoder 608 may be conditioned by combining the image features for a given resolution with the encoded output for the given resolution. Similarly, the decoder 610 in this case produces a decoded output (e.g. feature maps) at each of a plurality of different resolutions. For each of the plurality of different resolutions, the encoder 610 may be conditioned by combining the image features for a given resolution with the decoded output for the given resolution. This is shown using arrows in FIG. 6, in which the lowest resolution image features output by the first upsampling block 603a of the U-Net 601a are combined with the lowest resolution encoded output generated by the third encoding block 614c and the lowest resolution decoded output generated by the first decoding block 615a. Similarly, the highest resolution image features output by the third upsampling block 603c are combined with the highest resolution encoded input generated by the first encoding block 614a and the highest resolution decoded output generated by the third decoding block 615c. Combining image features with an encoded or decoded output may for example be performed by concatenating the image features (e.g. in the form of a tensor) with the encoded or decoded output (which may also be in the form of a tensor).

It is to be appreciated that the arrangement of FIG. 6 is simplified for ease of illustration and other layers may be included in other arrangements. For example, the autoencoder 600 may include at least one fully connected layer between the encoder 608 and the variational part 612.

As an example, an arrangement similar to that of FIG. 6 may be used in the system 500 of FIG. 5. For example, the system 500 may include a U-shaped multitask network including a shared encoder, and two separate decoders (one for conditioning the first decoder 520 and the other for conditioning the second decoder 522, although in some cases at least one of the first and second decoder may not be conditioned on the image features). The encoder may be based on a "ResNet" model (e.g. ResNet101) as described in the 2015 paper "Deep Residual Learning for Image Recognition" by Kaiming He et al (which is incorporated by reference where applicable). The encoder may be trained on one or more image data sets such as ImageNet (as described in "ImageNet: A Large-Scale Hierarchical Image Database" by Deng et al, 2009, incorporated by reference where applicable). The encoder may be either trained as part of an implementation and/or use a set of pre-trained parameter values. The decoders may for example include RefineNet units as described in "RefineNet: Multi-Path Refinement Networks for High-Resolution Semantic Segmentation", by G. Lin et al., published in the Proceedings of the IEEE Conference on Computer Vision and Pattern Recognition (CVPR), 2017 (incorporated by reference where applicable). The system 500 may further include two variational autoencoders (to provide the first and second decoders 520, 522). The encoder part of these autoencoders may be used during training only, but may be omitted during inference, when ground-truth values of a characteristic to be determined (e.g. a semantic segmentation or depth map) are typically unavailable. In these cases, the encoder part may be e.g. a VGG-like fully convolutional recognition model, and the decoder part may be e.g. a linear generative model.

In examples such as this, the first or second decoder 520, 522 may be a linear decoder. This approach can be used to obtain a linear relationship between the latent representation and the segmentation associated with the latent representation, which is conditioned on an input image in a nonlinear manner. This linearity for example allows pre-computation of Jacobians, which are e.g. used during optimisation. The optimisation may therefore be performed more rapidly than otherwise.

Figure 7:
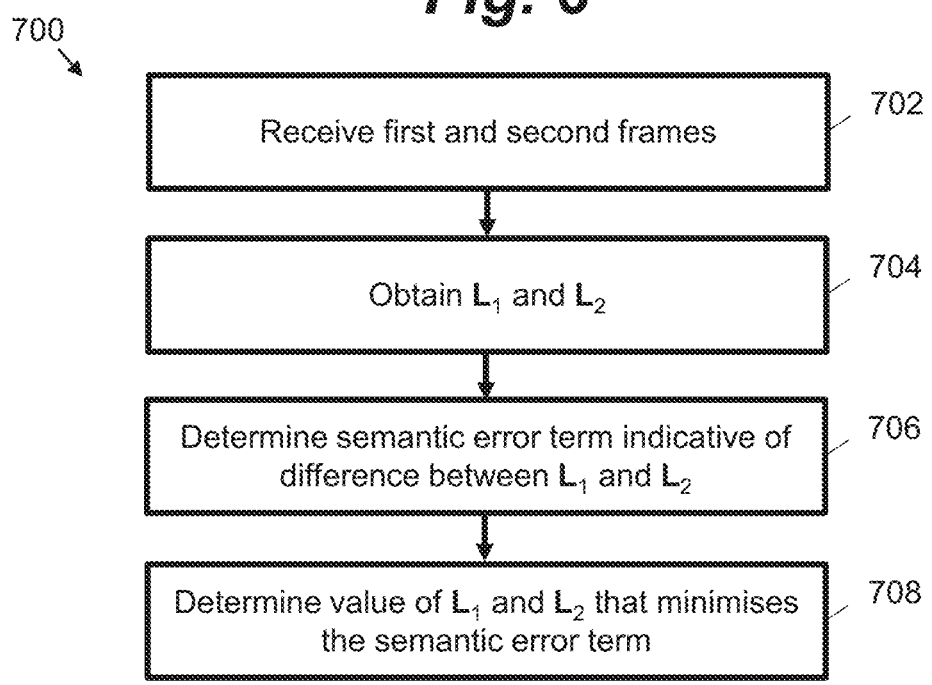
FIG. 7 is a flow diagram showing an optimisation method according to examples.

FIG. 7 is a flow diagram showing an optimisation method 700 according to examples. At item 702 of FIG. 7, the image data is received. The image data in this case includes a first frame representing a first view of the scene and a second frame representing a second view of the scene. The image data may be received e.g. using an input interface such as the input interfaces 402, 502 of FIGS. 4 and 5.

At item 704 of FIG. 7, a first and second latent representation, $L_1$, $L_2$, are obtained, e.g. using an initialisation engine such as the initialisation engines 406, 506 of FIGS. 4 and 5. In this example, the first latent representation is associated with a first segmentation, which is a semantic segmentation of the first view of the scene. The second latent representation in this case is associated with a second segmentation, which is a semantic segmentation of the second view of the scene. The first and the second views of the scene may be the same as or different from each other. In examples, the first and second latent representations are predetermined representations, e.g. zero representations.

At item 706 of FIG. 7, the first and second latent representations are jointly optimised, e.g. using an optimisation engine such as the optimisation engines 412, 512 of FIGS. 4 and 5, which for example implement optimisation methods in accordance with FIG. 2 or 3. In the example of FIG. 7, the optimisation includes the determination of a semantic error term indicative of a difference between the first latent representation and the second latent representation. Such a difference can be expressed in the form of various functions measuring distance or dissimilarity between two elements.

In an example, the first and second views of the scene, $I_1$, $I_2$, are partially overlapping and therefore share a common field of view. In this example, the first and second latent representations, $L_1$, $L_2$, may be decoded using a decoder such as the first decoder 420, 520 of FIGS. 4 and 5, to obtain decoded first and second latent representations, $L_{1d}$, $L_{2d}$. The decoded first and second latent representations, $L_{1d}$, $L_{2d}$ are for example unnormalised, and may therefore be pre-softmax predictions obtained from the decoder. A semantic error term, $r_s$, may be determined using the decoded first and second latent representations, for example using:

$$r_s = DS(L_{1d}^i, L_{2d}^j)$$

where DS represents a difference function such as a Euclidean distance function, $L_{1d}^i$ represents the decoded first latent representation for image region i in the first view of the scene, and $L_{2d}^j$ represents the decoded second latent representation for image region j in the second view of the scene. The image region i in the first view of the scene corresponds to the image region j in the second view of the scene. In other words, the same part of the scene is present in both image regions i and j. The image region j in the second view of the scene which corresponds to the image region i in the first view of the scene may be found using a dense correspondence function, which is for example based on an estimated relative rigid body transformation of the scene from the first view to the second view.

The semantic error term, $r_s$, may be determined using an optimisation engine, such as the optimisation engines 412, 512 of FIGS. 4 and 5, and may be used as a residual (e.g. as determined in item 312 of FIG. 3). A Jacobian may be determined using the semantic error term, $r_s$, as a residual (e.g. as described with reference to item 314 of FIG. 3), and the Jacobian may then be used to determine the values of the first and second latent representations that minimise a function of the semantic error term, $r_s$, such as a sum of squares function.

This process may be performed iteratively, for example as described with reference to FIG. 3. On this basis, a value of the first latent representation and a value of the second latent representation that minimises the semantic error term may be found at item 708 of FIG. 7. These values may correspond to the optimised first and second latent representations, respectively. However, in some cases, further optimisation or further processing of these values may be performed in order to obtain the optimised first and second latent representations. Optimised first and second semantic segmentations, associated with the first and second views of the scene respectively, may be derived from the optimised first and second latent representations, e.g. by decoding the optimised first and second latent representations and performing a normalisation procedure.

Figure 8:
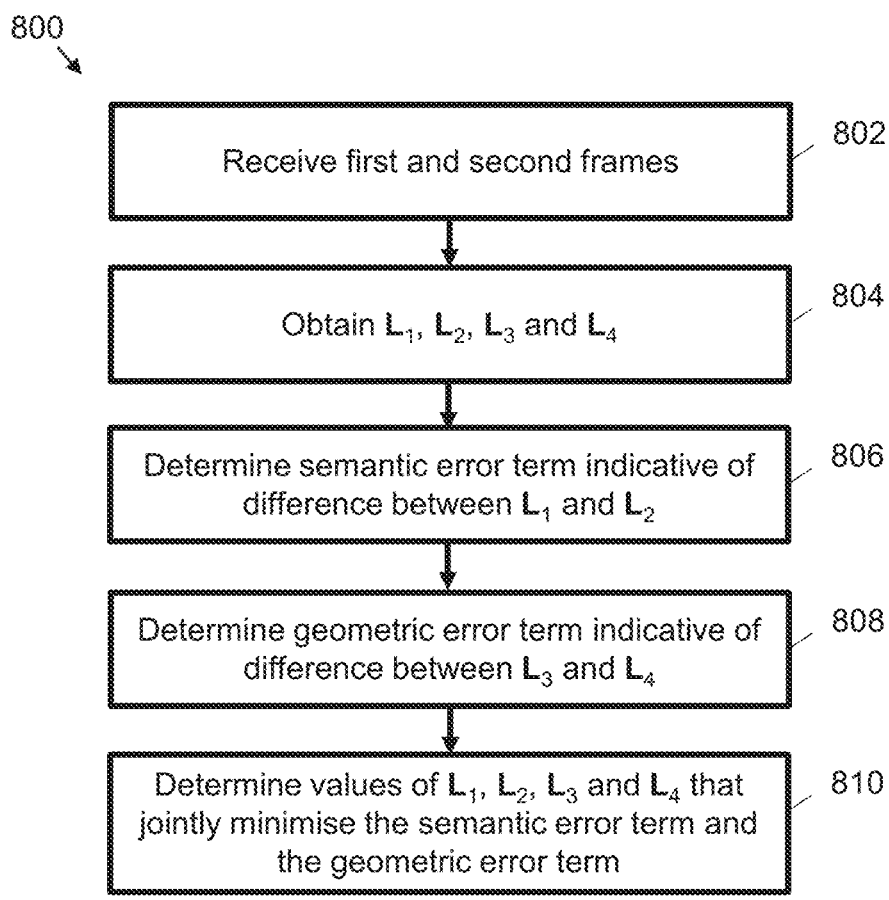
FIG. 8 is a flow diagram showing an optimisation method according to further examples.

FIG. 8 is a flow diagram showing an optimisation method 800 according to further examples. The optimisation method 800 of FIG. 8 is similar to the optimisation method 700 of FIG. 7. Similarly to FIG. 7, the optimisation method 800 of FIG. 8 may be used to obtain optimised first and second latent representations that are associated with optimised first and second semantic segmentations associated with the first and second views of a scene respectively. In addition, though, the optimisation method 800 of FIG. 8 may be used to obtain optimised third and fourth latent representations that are associated with optimised first and second depth maps associated with the first and second views of the scene respectively.

Item 802 of FIG. 8 is similar to item 702 of FIG. 7; a corresponding description is to be taken to apply.

At item 804 of FIG. 8, a first and second latent representation, $L_1$, $L_2$, are obtained, e.g. using an initialisation engine such as the initialisation engines 406, 506 of FIGS. 4 and 5. In this example, the first latent representation is associated with a first segmentation, which is a semantic segmentation of the first view of the scene. The second latent representation in this case is associated with a second segmentation, which is a semantic segmentation of the second view of the scene. The first and the second views of the scene may be the same as or different from each other. In examples, the first and second latent representations are predetermined representations, e.g. zero representations.

Item 804 of FIG. 8 also involves obtaining a third latent representation associated with a depth map of the first view of the scene, $L_3$, and a fourth latent representation associated with a depth map of the second view of the scene, $L_4$. The third and fourth latent representations, $L_3$, $L_4$, may be obtained using an initialisation engine such as the initialisation engines 406, 506 of FIGS. 4 and 5, and may be predetermined representations, e.g. zero representations.

In examples in accordance with FIG. 8, the first, second, third and fourth latent representations are jointly optimised in the latent space to obtain the optimised first and second latent representations and optimised third and fourth latent representations. Such an optimisation may be performed using a method such as that of FIG. 3, and may be implemented using an optimisation engine such as the optimisation engines 412, 512 of FIGS. 4 and 5.

In particular, in the example of FIG. 8, the joint optimisation of the first, second, third and fourth latent representations in the latent space includes determining a semantic error term indicative of a difference between the first latent representation and the second latent representation, at item 806. The semantic error term may be determined as described with reference to item 706 of FIG. 7.

In this example, the joint optimisation of the first, second, third and fourth latent representations in the latent space also includes determining a geometric error term, $r_d$, indicative of a difference between the third latent representation and the fourth latent representation, at item 808. The geometric error term, $r_d$, may be determined using a first depth map, $D_1$, which may be obtained by decoding the third latent representation (and, in some cases, normalising a decoded third latent representation). The third latent representation may be decoded using a decoder such as the second decoder 422, 522 of FIGS. 4 and 5, which has been trained to decode a latent representation of a depth map to obtain the depth map. The determination of the geometric error term, $r_d$, in this case also uses a second depth map, $D_2$, which may be obtained by decoding the fourth latent representation (and, in some cases, normalising a decoded fourth latent representation). For an image region i in the first view of the scene, the geometric error term, $r_d$, may be expressed as:

$$r_d = D_1^i - D_2^j$$

where $D_1^i$ represents a depth value for image region i in the first view of the scene (as obtained from the first depth map, $D_1$), and $D_2^j$ represents a depth value for image region j in the second view of the scene (as obtained from the second depth map, $D_2$). The image region i in the first view of the scene corresponds to the image region j in the second view of the scene. In this example, the geometric error term, $r_d$, is a difference between $D_1^i$ and $D_2^j$, however in other cases, the geometric error term, $r_d$, may be or include a difference function (such as Euclidean distance function) based on $D_1^i$ and $D_2^j$. The geometric error term, $r_d$, may be determined using an optimisation engine, such as the optimisation engines 412, 512 of FIGS. 4 and 5, and may be used as a residual (e.g. as determined in item 312 of FIG. 3).

At item 810 of FIG. 8, the values of the first, second, third and fourth latent representations, respectively, that jointly minimise the semantic error term and the geometric error term are determined. This joint optimisation may include evaluating a Jacobian using at least the semantic error term and the geometric error term as residuals. Such a Jacobian may then be used to determine the values of the first, second, third and fourth latent representations that minimise a function of these residuals, such as a sum of squares function. In this way, obtain optimised first, second, third and fourth latent representations may be obtained.

Optimised semantic segmentations and depth maps may be obtained from the optimised first, second, third and fourth latent representations, e.g. by decoding these representations. For example, the optimised first and second latent representations may be decoded to obtain optimised semantic segmentations of the first and second views of the scene, respectively. The optimised third and fourth latent representations may be decoded to obtain optimised depth maps of the first and second views of the scene, respectively. In some cases, the optimised first and second latent representations are decoded using a first decoder trained to obtain a semantic segmentation from an input latent representation of a semantic segmentation, and the optimised third and fourth latent representations are decoded using a second decoder trained to obtain a depth map from an input latent representation of a depth map.

Figure 9:
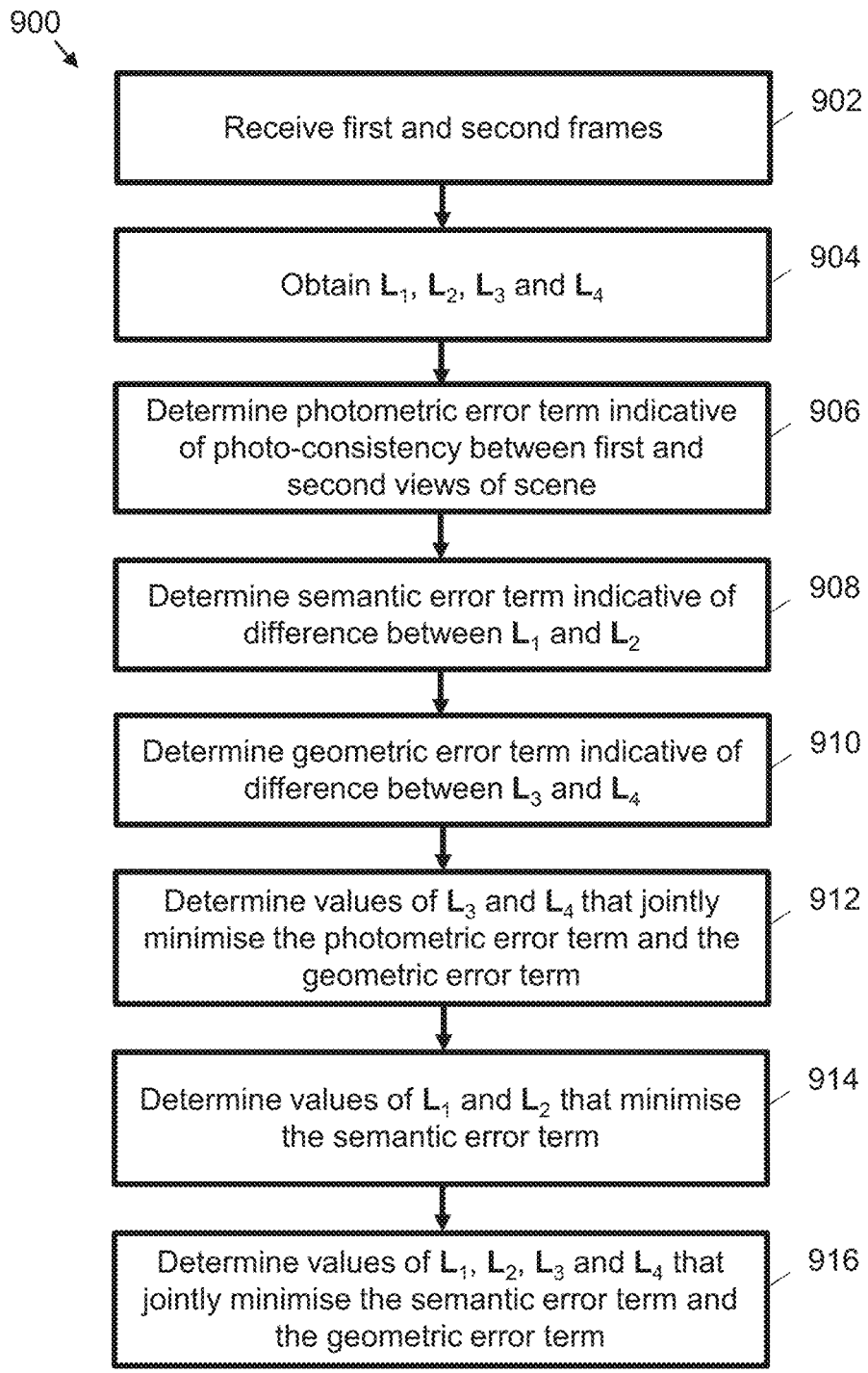
FIG. 9 is a flow diagram showing an optimisation method according to yet further examples.

FIG. 9 is a flow diagram showing an optimisation method 900 according to further examples. The optimisation method 900 of FIG. 9 is similar to the optimisation method 800 of FIG. 8. However, the optimisation method 900 of FIG. 9 also includes an optimisation based on photometric data associated with first and second frames of image data.

Items 902 and 904 of FIG. 9 are similar to items 802 and 804 of FIG. 8, respectively; corresponding descriptions are to be taken to apply.

At item 906, a photometric error term indicative of a photo-consistency between a first view of a scene (as captured in the first frame) and a second view of the scene (as captured in the second frame) is determined. A portion of the first view of the scene may be considered photo-consistent with a corresponding portion of the second view (which shows the same part of the scene as in the portion of the first view) where a photometric characteristic, e.g. a colour or intensity value, is similar or the same. In other words, the same part of the scene should appear similar or the same irrespective of the viewpoint of a camera used to obtain an image of this part of the scene. The photometric error term for example provides a measure of the degree to which a given portion of the first view (e.g. an image region i of the first view) is photo-consistent with a corresponding portion of the second view (e.g. an image region j of the second view).

As an example, for an image region i in the first view of the scene, the photometric error term, $r_p$, may be expressed as:

$$r_p = I_1^i - I_2^j$$

where $I_1^i$ represents an intensity of image region i in the first view of the scene, and $I_2^j$ represents an intensity of image region j in the second view of the scene. The image region i in the first view of the scene corresponds to the image region j in the second view of the scene. The intensity is for example a measure of the amount of light that is received from a given portion of the scene. In an example in which the image regions j each correspond to respective pixels of the first and second views, the pixel values of pixels i, j in the first and second frames may be taken as the intensities $I_1^i$, $I_2^j$ for determining the photometric error term. This is merely an example, though, and in other cases, a photometric error term may be based on different photometric characteristics than intensity, e.g. brightness (which is for example a measure of a visual perception elicited by the luminance of the scene) or colour (which may be expressed as a position in a colour space). In this example, the photometric error term, $r_p$, is a difference between $I_1^i$ and $I_2^j$, however in other cases, the photometric error term, $r_p$, may be or include a difference function (such as Euclidean distance function) based on $I_1^i$ and $I_2^j$. The photometric error term, $r_p$, may be determined using an optimisation engine, such as the optimisation engines 412, 512 of FIGS. 4 and 5.

Item 908 of FIG. 9 involves determining a semantic error term, $r_s$, indicative of a difference between a first latent representation and a second latent representation (which are associated with a semantic segmentation of the first and second views of the scene, respectively). The semantic error term, $r_s$, may be determined as described with reference to item 806 of FIG. 8.

Item 910 of FIG. 9 involves determining a geometric error term, $r_d$, indicative of a difference between the third latent representation and the fourth latent representation (which are associated with a depth map of the first and second views of the scene, respectively). The geometric error term, $r_d$, may be determined as described with reference to item 808 of FIG. 8.

At least one of the photometric error term, $r_p$, the semantic error term, $r_s$, and the geometric error term, $r_d$, may be used as a residual (e.g. as determined in item 312 of FIG. 3). One or more of these residuals may be used in an optimisation procedure e.g. involving the determination of a Jacobian using the residual, and the use of a Jacobian to determine values of the first, second, third and fourth latent representations that minimise a function of the residual as described with reference to items 314 and 316 of FIG. 3. In some cases, the optimisation process involves at least one joint optimisation of two of these error terms. The optimisation may involve a plurality of optimisations. The plurality of optimisations may include optimisation of a single error term or joint optimisation of at least two of the error terms. For example, in some cases in which the photometric error term is determined, the optimisation may include determining respective values of at least one of the first, second, third and fourth latent representations that minimise the photometric error term. By minimising the photometric error term, a pose of the camera (e.g. during capture of the first and second frames) may be more accurately determined.

The example of FIG. 9 involves determining values of the third and fourth latent representations that jointly minimise the photometric error term and the geometric error term, at item 912. Item 912 of FIG. 9 may therefore include determining a Jacobian based on the photometric error term and the geometric error term, and determining the values of the third and fourth latent representations that minimise a function of the photometric and geometric error terms, using the Jacobian.

At item 914 of FIG. 9, values of the first and second latent representations that minimise the semantic error term are determined, e.g. using a joint optimisation process. Item 914 of FIG. 9 may therefore be similar to item 708 of FIG. 7.

Finally, at item 916 of FIG. 9, values of the first, second, third and fourth latent representations that jointly minimise the semantic error term and the geometric error term are determined. Item 916 of FIG. 9 may therefore include determining a Jacobian based on the semantic error term and the geometric error term, and determining the values of the first, second, third and fourth latent representations that minimise a function of the semantic and geometric error terms, using the Jacobian. The optimised values of the first and second latent representations obtained at item 914 and the optimised values of the third and fourth latent representations obtained at item 912 may be used as inputs to the optimisation of item 916. In this way, both geometry and semantics may be coupled in an optimisation framework, which may improve both the geometric estimates (e.g. depth maps) derived from the third and fourth latent representations and the semantic estimates (e.g. semantic segmentations) derived from the first and second latent representations.

FIGS. 7 to 9 are merely examples of latent representations that may be determined using the methods herein. It is to be appreciated that these methods may be used to obtain other latent representations. For example, in some cases, the first latent representation may be associated with a semantic segmentation of the first view of the scene and the second latent representation may be associated with a depth map for the second view of the scene.

Figure 10A:
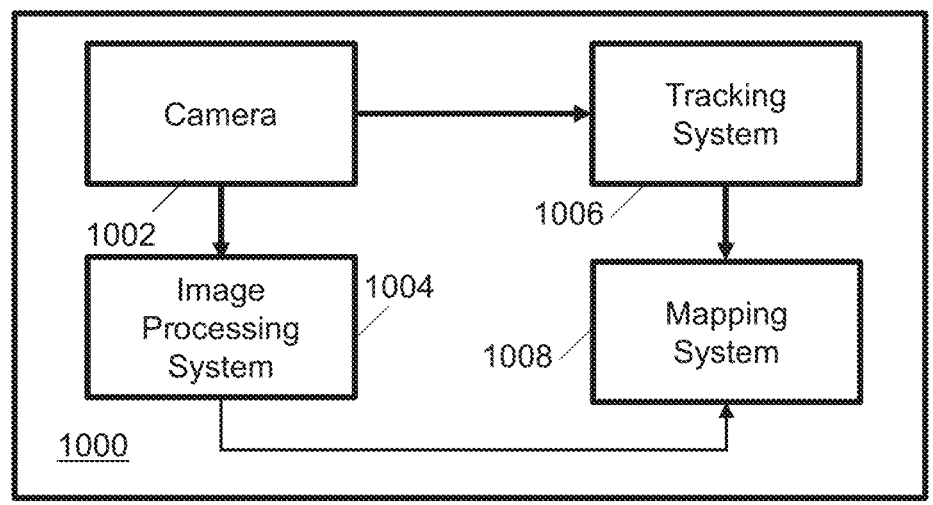
FIG. 10A is a schematic diagram showing components of a computing system according to examples.

FIG. 10A is a schematic diagram showing components of a computing system 1000 which may be used to implement any of the methods described herein. The computing system 1000 may be a single computing device (e.g. a desktop, laptop, mobile and/or embedded computing device) or may be a distributed computing system, which is distributed over multiple discrete computing devices (e.g. certain components may be implemented by one or more server computing devices based on requests from one or more client computing devices made over a network).

The computing system 1000 includes a camera 1002, which in this case is a video camera arranged to provide frames of video, which for example include observations of a scene. The computing system 1000 includes an image processing system 1004, which is arranged to implement methods in accordance with those described herein. In FIG. 10A, the image processing system 1004 is arranged to process image data obtained by the camera 1002 to obtain an optimised segmentation, e.g. a semantic segmentation, of at least one view of the scene. In one case, the image processing system 104 is arranged to obtain an optimised first segmentation of a first view of the scene and an optimised second segmentation of a second view of the scene. The optimised first and second segmentations are, for example, semantic segmentations. The image processing system 1004 may be arranged to obtain other optimised segmentations or maps in addition, e.g. an optimised depth map for at least one view of the scene.

The computing system 1000 also includes a tracking system 1006 arranged to determine poses of the camera 1002 during observation of the scene. The computing system 1000 includes a mapping system 1008 arranged to populate a map of the scene with the optimised segmentations or maps obtained by the image processing system 1004. In FIG. 10A, the mapping system 1008 is arranged to populate a map of the scene with at least one of the optimised first segmentation of the first view of the scene and first pose data representative of a first pose of a camera during capture of the first view of the scene and the optimised second segmentation of the second view of the scene and second pose data representative of the pose of the camera during capture of the second view of the scene.

The tracking and mapping systems 1006, 1008 may form part of a simultaneous localisation and mapping (SLAM) system. A SLAM system within the field of robotic mapping and navigation acts to construct and update a map of an unknown environment while simultaneously locating a robotic device associated with the map within the environment. For example, the robotic device may be the device that is constructing, updating and/or using the map.

Figure 10B:
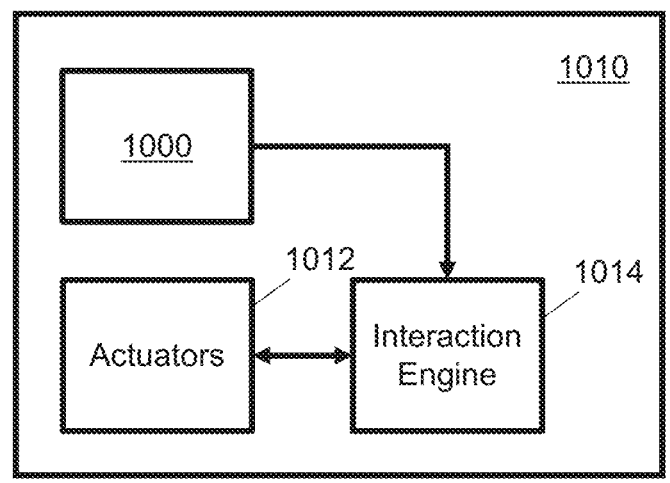
FIG. 10B is a schematic diagram showing components of a robotic device according to examples.

FIG. 10B is a schematic diagram showing components of a robotic device 1010 according to an example. The robotic device 1010 includes the computing system 1010 of FIG. 10A. The robotic device 1010 also includes one or more actuators 1012 to enable the robotic device 1010 to interact with a surrounding three-dimensional environment. At least a portion of the surrounding three-dimensional environment may be shown in the scene captured by the camera 1002 of the computing system 1000. In the case of FIG. 10B, the robotic device 1010 may be configured to capture image data, e.g. in the form of video data, as the robotic device 1010 navigates a particular environment (e.g. as per device 130 in FIG. 1A). In another case, though, the robotic device 1010 may scan an environment, or operate on image data received from a third party, such as a user with a mobile device or another robotic device. As the robotic device 1010 processes the image data, it may be arranged to obtain optimised latent representations from which segmentations and/or maps (e.g. semantic segmentations or depth maps) may be derived, e.g. to enable the robotic device 1010 to map its environment.

The robotic device 1010 also includes an interaction engine 1014 including at least one processor to control the one or more actuators 1012. The interaction engine 1014 of FIG. 10B may be configured to use the segmentations and/or maps obtained by the robotic device 1010 to control the robotic device 1010 to interact with the surrounding three-dimensional environment. For example, a semantic segmentation may be used to identify a particular object within an environment which is to be grabbed, or a depth map may be used to identify a position of the object to be grabbed and/or to avoid collisions with barriers such as walls.

Examples of functional components as described herein with reference to FIGS. 10A and 10B may include dedicated processing electronics and/or may be implemented by way of computer program code executed by a processor of at least one computing device. In certain cases, one or more embedded computing devices may be used. Components as described herein may include at least one processor operating in association with memory to execute computer program code loaded onto a computer readable medium. This medium may include solid state storage such as an erasable programmable read only memory and the computer program code may include firmware. In other cases, the components may include a suitably configured system-on-chip, application-specific integrated circuit and/or one or more suitably programmed field-programmable gate arrays. In one case, the components may be implemented by way of computer program code and/or dedicated processing electronics in a mobile computing device and/or a desktop computing device. In one case, the components may be implemented, as well as or instead of the previous cases, by one or more graphical processing units executing computer program code. In certain cases, the components may be implemented by way of one or more functions implemented in parallel, e.g. on multiple processors and/or cores of a graphics processing unit.

Figure 11:
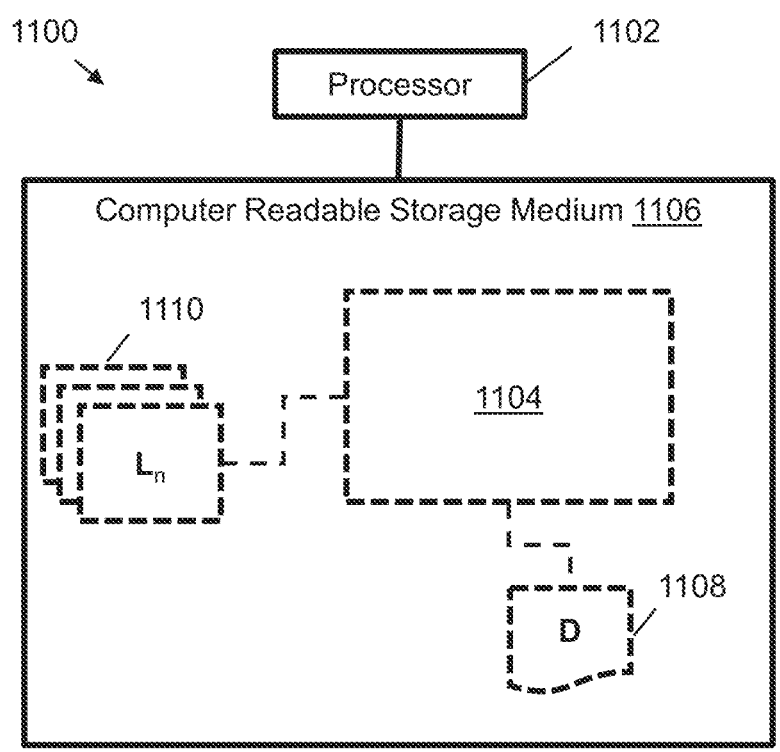
FIG. 11 is a schematic diagram showing a non-transitory computer readable medium according to examples.

FIG. 11 is a schematic diagram showing an example 1100 of a processor 1102 and a non-transitory computer-readable storage medium 1104 comprising computer-executable instructions 1104. The computer-executable instructions 1104, when executed by the processor 1102, cause a computing device, such as a computing device including the processor 1102, to obtain at least one latent representation associated with a view of a scene (e.g. as captured in image data). The instructions may result in a method being performed that is similar to the example methods described above. For example, the computer-readable storage medium 1106 may be arranged to store image data 1108 representative of an observation of the scene. The computer-executable instructions 1104, when executed by the processor 1102, may be configured to cause a computing device to process the image data 1108 to generate at least one optimised latent representation 1110, which may be stored in the computer-readable storage medium 1106. Although in FIG. 11, the image data 1108 and the optimised latent representations 1110 are shown as being stored on the computer-readable storage medium 1106, in other examples, at least one of the image data 1108 and the optimised latent representations 1110 may be stored in storage which is external to (but accessible by) the computer-readable storage medium 1106.

Further examples herein relate to the training of a latent representation engine to predict a semantic segmentation of an input image. These examples will be now described with reference to FIGS. 12 to 14.

Figure 12:
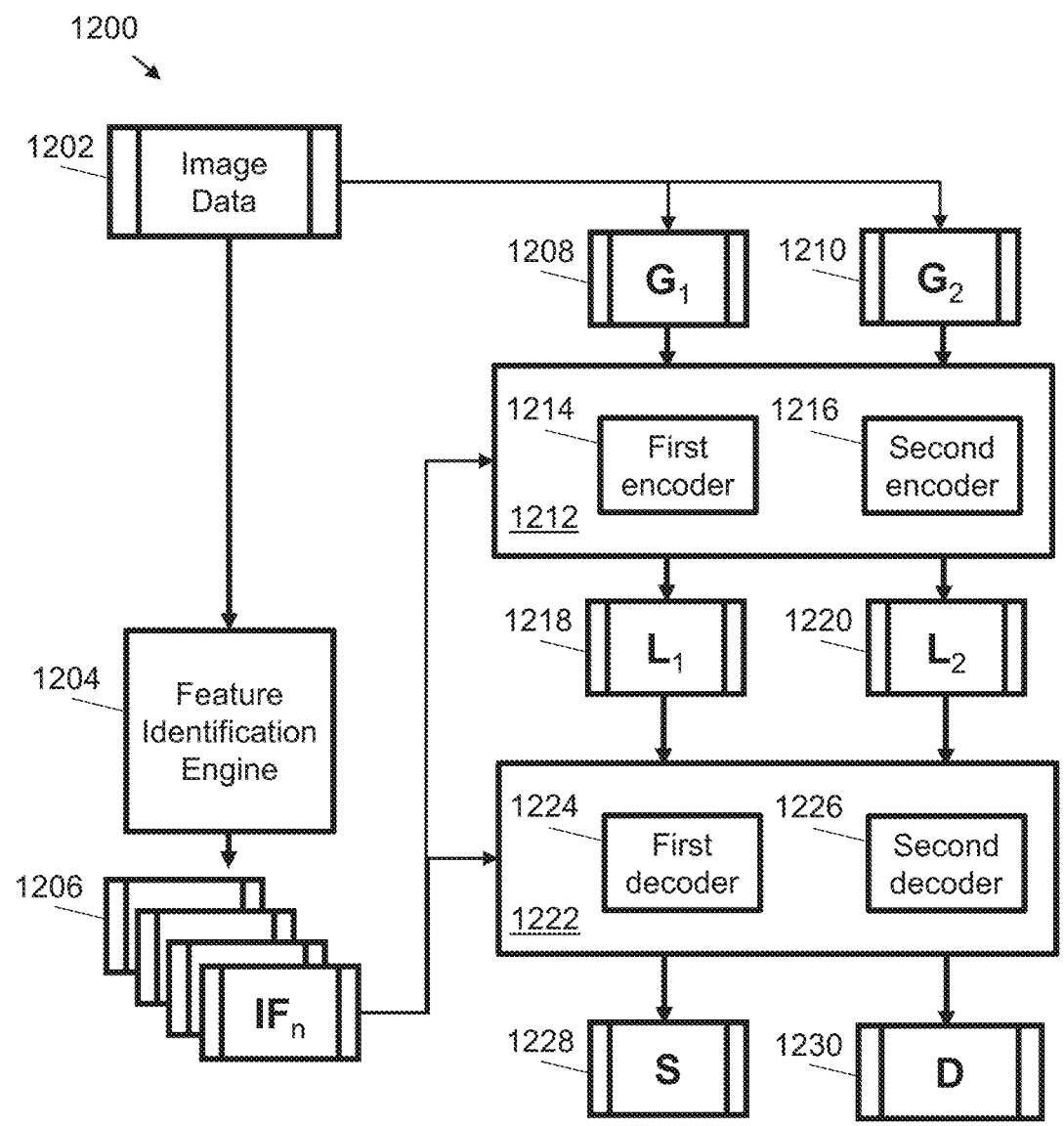
FIG. 12 is a schematic diagram of a latent representation prediction engine during training according to examples.

FIG. 12 is a schematic diagram of a latent representation prediction engine 1200 during training, according to examples. The latent representation prediction engine 1200 receives image data 1202. The image data 1202 in this case is training data, which is used to train the latent representation prediction engine 1200 to predict a semantic segmentation of an input image. In this example, the image data 1202 includes image data representative of the input image, e.g. as a 2D array of pixel values (such as pixel intensity values). For example, the image may be a colour image. This image data is processed by a feature identification engine 1204 of the latent representation prediction engine 1200. The feature identification engine 1204 is arranged to detect image features 1206 of an input image (e.g. by processing the image data 1202). The feature identification engine 1204 and image features 1206 of FIG. 12 may be similar to or the same as the feature identification engine 532 and image features 534 of FIG. 5; corresponding descriptions are to be taken to apply.

Referring back to the image data 1202, the image data 1202 in the example of FIG. 12 also includes a ground-truth semantic segmentation 1208 of the input image. A ground-truth semantic segmentation for example includes a plurality of spatial elements, each associated with a respective portion of the input image. Each of the spatial elements is labelled with a semantic label, indicating the actual content of the respective portion of the input image. The actual content is for example the type or class of object that is present in the portion of the input image, e.g. "table", "bed", "chair". The semantic label need not be a text label (e.g. a string), but may instead be a numerical or other label which is nevertheless indicative of a particular class of object. There need not be a one-to-one mapping between the spatial elements of the ground-truth semantic segmentation 1208 and the pixels of the input image, although there may be.

The image data 1202 of FIG. 12 also includes a ground-truth depth map 1210 of the input image. The ground-truth depth map 1210 may be similar to the ground-truth semantic segmentation 1208, but include depth values rather than semantic labels. As for the ground-truth semantic segmentation 1208, there need not be a one-to-one mapping between depth elements of the ground-truth depth map 1210 and pixels of the input image, although there may be.

The ground-truth semantic segmentation and depth map 1208, 1210 are processed by an encoder system 1212 of the latent representation prediction engine 1200. In this example, the encoder system 1212 includes a first encoder 1214 and a second encoder 1216. The first encoder 1214 is to be trained to encode the ground-truth semantic segmentation 1208 to generate a latent representation of the ground-truth semantic segmentation 1208. The second encoder 1216 is to be trained to encode the ground-truth depth map 1210 to generate a latent representation of the ground-truth depth map 1210. The first encoder 1214 and the second encoder 1216 in this example are each conditioned using the image features 1206 obtained by the feature identification engine 1204, and may be similar to or the same as the encoder 608 of FIG. 6. For example, the first encoder 1214 may be arranged to produce an encoded output at each of a plurality of different resolutions and the image features 1206 may be at each of the plurality of different resolutions. In this case, the first encoder 1214 may be conditioned on the image features 1206 by, for each of the plurality of different resolutions, combining the image features 1206 for a given resolution with the encoded output for the given resolution, e.g. using concatenation. In other examples, though, the second encoder 1216 may not be conditioned using the image features 1206. The second encoder 1216 may be similar to or different from the first encoder 1214 in structure.

The first encoder 1214 of FIG. 6 outputs a first latent representation 1218, which is a latent representation of the ground-truth semantic segmentation 1208. The second encoder 1216 outputs a second latent representation 1220, which is a latent representation of the ground-truth depth map 1210.

The first and second latent representations 1218, 1220 are processed using a decoder system 1222 in FIG. 12. The decoder system 1222 includes a first decoder 1224 and a second decoder 1226. The first decoder 1224 is to be trained to decode a latent representation of the ground-truth semantic segmentation 1208 to obtain a predicted semantic segmentation of an input image. The second decoder 1226 is to be trained to decode a latent representation of the ground-truth depth map 1210 to obtain a predicted depth map of the input image. The first decoder 1224 and the second decoder 1226 are each conditioned using the image features 1206 obtained by the feature identification engine 1204, and may be similar to or the same as the decoder 610 of FIG. 6. For example, the first decoder 1224 may be arranged to produce decoded output at each of a plurality of different resolutions and the image features 1206 may be at each of the plurality of different resolutions. In this case, the first decoder 1224 may be conditioned on the image features 1206 by, for each of the plurality of different resolutions, combining the image features 1206 for a given resolution with the decoded output for the given resolution, e.g. using concatenation. The second decoder 1226 may be similar to or different from the first decoder 1224 in structure. For example, in some cases, the second decoder 1226 may not be conditioned using the image features 1206. Furthermore, in some cases, the first and/or second decoder 1224, 1226 may be conditioned using the image features 1206 without the first and/or second encoder 1214, 1216 being conditioned using the image features 1206. In a particular case, each of the first and second decoders 1224, 1226 are conditioned using the image features 1206 and neither of the first and second encoders 1214, 1216 are conditioned using the image features 1206, but this is merely an example.

The first encoder 1214 and the first decoder 1224 in this example correspond to a first autoencoder, which is to be trained to autoencode a semantic segmentation of an input image. The second encoder 1216 and the second decoder 1226 in this example correspond to a second autoencoder, which is to be trained to autoencode a depth map of an input image. As explained with reference to FIG. 6, an autoencoder may be considered to be conditioned using image features where at least one of the encoder or the decoder of the autoencoder is conditioned using the image features. Hence, in the example of FIG. 12, both the first autoencoder and the second autoencoder are conditioned using the image features.

As described with reference to FIG. 6, the first and second autoencoders may be variational autoencoders, to improve the smoothness of a mapping between the latent representations and the output of the autoencoder. For example, the first encoder 1214 and the first decoder 1224 may be trained to perform variational autoencoding of an input semantic segmentation of an input image, as described with reference to FIG. 6. In some cases, the first decoder 1224 and/or the second decoder 1226 may be a linear decoder such that the decoder system 1222 includes a linear decoder.

The first decoder 1224 is arranged to output a predicted semantic segmentation 1228 of an input image and the second decoder 1226 is arranged to output a predicted depth map 1230 of an input image. The predicted semantic segmentation 1228 and the predicted depth map 1230 may be a normalised semantic segmentation or depth map. Normalisation may be performed by the decoder system 1222 (e.g. by the first decoder 1224 and/or the second decoder 1226) or by another component.

The predicted semantic segmentation 1228 may be used to adjust weights or other parameters associated with the first encoder 1214 and the first decoder 1224, thereby training the first encoder and decoder 1214, 1224 to more accurately autoencode an input semantic segmentation. For example, the latent representation prediction engine 1200 may be updated using a loss function based on a comparison between the predicted semantic segmentation 1228 and the ground-truth semantic segmentation 1208.

Weights associated with the second encoder 1216 and the second decoder 1226 may be updated in a similar manner. For example, the latent representation prediction engine 1200 may be updated using a loss function based on a comparison between the predicted semantic segmentation 1228 and the ground-truth semantic segmentation 1208.

A further input image may then be processed using the encoder system 1212 and the decoder system 1222 with updated weights, and the weights may be updated again in a similar manner. This process may be performed repeatedly using a set of training data including pairs of input image data and ground-truth semantic segmentations and/or ground-truth depth data. In this way, the latent representation prediction engine 1200 may be trained to decode an input latent representation associated with a semantic segmentation to obtain the semantic segmentation (e.g. using the first decoder 1224), and to decode an input latent representation associated with a depth map to obtain the depth map (e.g. using the second decoder 1226). The first and second decoders 1224, 1226 may hence be in the methods described above with reference to FIGS. 3 to 11, to obtain optimised latent representations and/or to obtain optimised segmentations or maps.

It is to be appreciated that FIG. 12 is merely an example of a latent representation prediction engine 1200. In other cases, the feature identification engine 1204 may be omitted. In such cases, the encoder system 1212 and the decoder system 1222 need not be conditioned on the image features 1206. Furthermore, whereas the latent representation prediction engine 1200 of FIG. 12 is arranged to predict a semantic segmentation and a depth map associated with an input image, in other cases the latent representation prediction engine may be arranged to predict only one of the semantic segmentation or the depth map (or may be arranged to predict a different segmentation or map). For example, in one case, the latent representation prediction engine 1200 is arranged to obtain the predicted semantic segmentation 1228 without obtaining the predicted depth map 1230. In this case, the image data 1202 may not include a ground-truth depth map 1210, and the second encoder 1216 and the second decoder 1226 may be omitted. In this case, at least one of the first encoder 1214 or the first decoder 1224 may be conditioned using the image features 1206, such that the autoencoder to autoencode the semantic segmentation (which in this case includes the first encoder 1214 and the first decoder 1224) is conditioned using the image features 1206.

Figure 13:
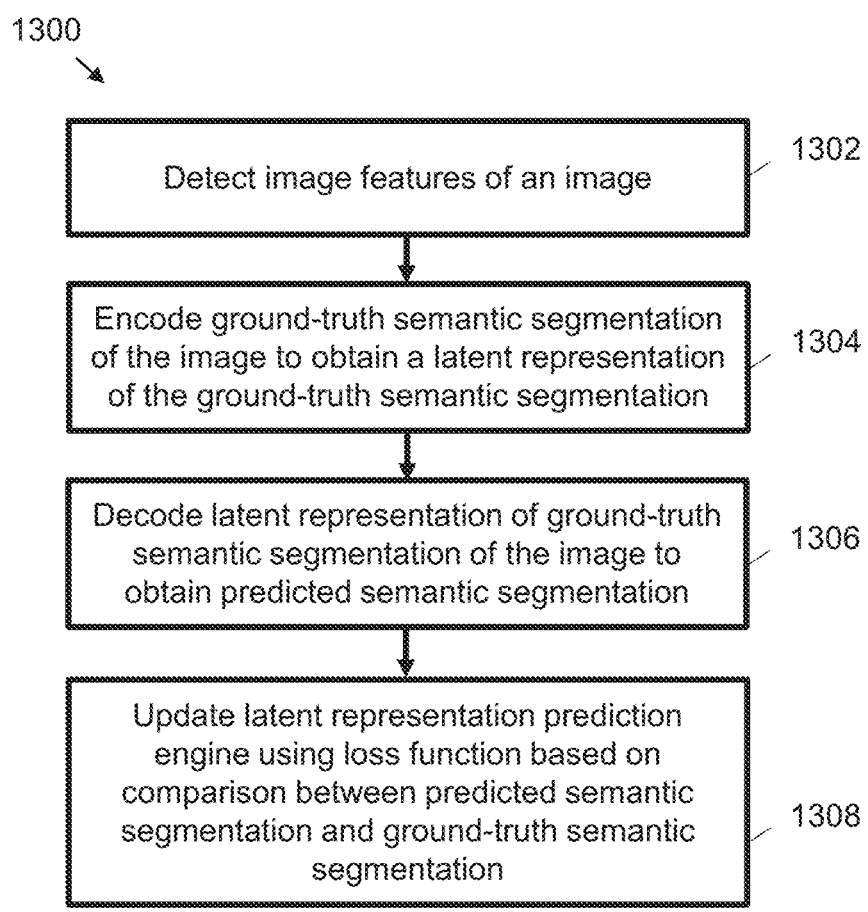
FIG. 13 is a flow diagram showing a method of training a latent representation prediction engine according to examples.

FIG. 13 is a flow diagram showing a method 1300 of training a latent representation prediction engine according to examples. The method 1300 of FIG. 13 may be used with the latent representation prediction engine 1200 of FIG. 12 or with a similar latent representation prediction engine but with the second encoder and decoder 1216, 1226 omitted. The method 1300 may be performed at a configuration stage, prior to performing the methods of obtaining an optimised latent representation as described herein (which for example use a decoder system which may be trained using the method 1300).

At item 1302 of FIG. 13, image features of an image are detected. This may be performed using the feature identification engine 1204 of FIG. 12. The image in this case is represented by image data, which is for example training data including samples for a plurality of different scenes. Each sample of the training data may include photometric data representative of a scene (which may be processed to detect the image features), and at least one ground-truth segmentation or map of the scene.

At item 1304 of FIG. 13, a ground-truth semantic segmentation of the image is encoded using an encoder. The encoder may be conditioned using the image features, such as the first encoder 1214 of FIG. 12, although need not be. In this way, a latent representation of the ground-truth semantic segmentation may be obtained.

At item 1306 of FIG. 13, the latent representation of the ground-truth semantic segmentation is decoded using a decoder to obtain a predicted semantic segmentation of the image. In this case, the decoder is conditioned using the image features, and may be similar to or the same as the first decoder 1224 of FIG. 12.

At item 1308 of FIG. 13, the latent representation prediction engine is updated using a loss function based on a comparison between the predicted semantic segmentation of the image and the ground-truth semantic segmentation of the image. In this case, the latent representation prediction engine includes the encoder system and the decoder system, and may include a neural network architecture. A loss function typically provides a measure of a difference between a predicted value and a ground-truth value, and may take various forms. For example, the loss function may include a squared error between the predicted semantic segmentation and the ground-truth semantic segmentation.

The loss function may include a reconstruction term (sometimes referred to as a reconstruction loss), which constrains the latent representation prediction engine to learn to accurately autoencode an input (e.g. the ground-truth semantic segmentation for a given sample). As an example, segmentation labels of the ground-truth semantic segmentation, which may be discrete numbers, may be one-hot encoded before being processed by the latent representation prediction engine. In such a case, a multi-class cross-entropy function may be used as the reconstruction loss, R:

$$R = \frac{1}{N}\sum_{i=1}^{N}\sum_{c=1}^{C} k_c^{(i)} \log p_c^{(i)}$$

where C is the number of classes, $k_c^{(i)}$ is the c-th element of the one-hot encoded semantic labels for the i-th pixel in the ground-truth semantic segmentation and $p_c^{(i)}$ is the predicted semantic segmentation for the i-th pixel (which is for example the output of the decoder system after normalisation). However, this is merely an example and other reconstruction terms may be used in other cases.

The loss function may also include regularisation term (sometimes referred to as a regularisation loss), which constraints the latent representation prediction engine to learn to predict latent representations within a meaningful latent space (e.g. such that latent representations that are closer together in the latent space are more similar than those which are further apart). As an example, the regularisation term may be based on the Kullback-Leibler divergence, e.g. as explained in "Auto-Encoding Variational Bayes" by D. P. Kingma and J. Ba. Adam, published in Proceedings of the International Conference on Learning Representations (ICLR), 2014.

Items 1302 to 1308 may be repeated for a plurality of samples to determine a set of parameter values for the latent representation prediction engine (e.g. weights associated with a neural network architecture) for the latent representation prediction engine to be able to predict a semantic segmentation from a latent representation associated with a semantic segmentation.

Figure 14:
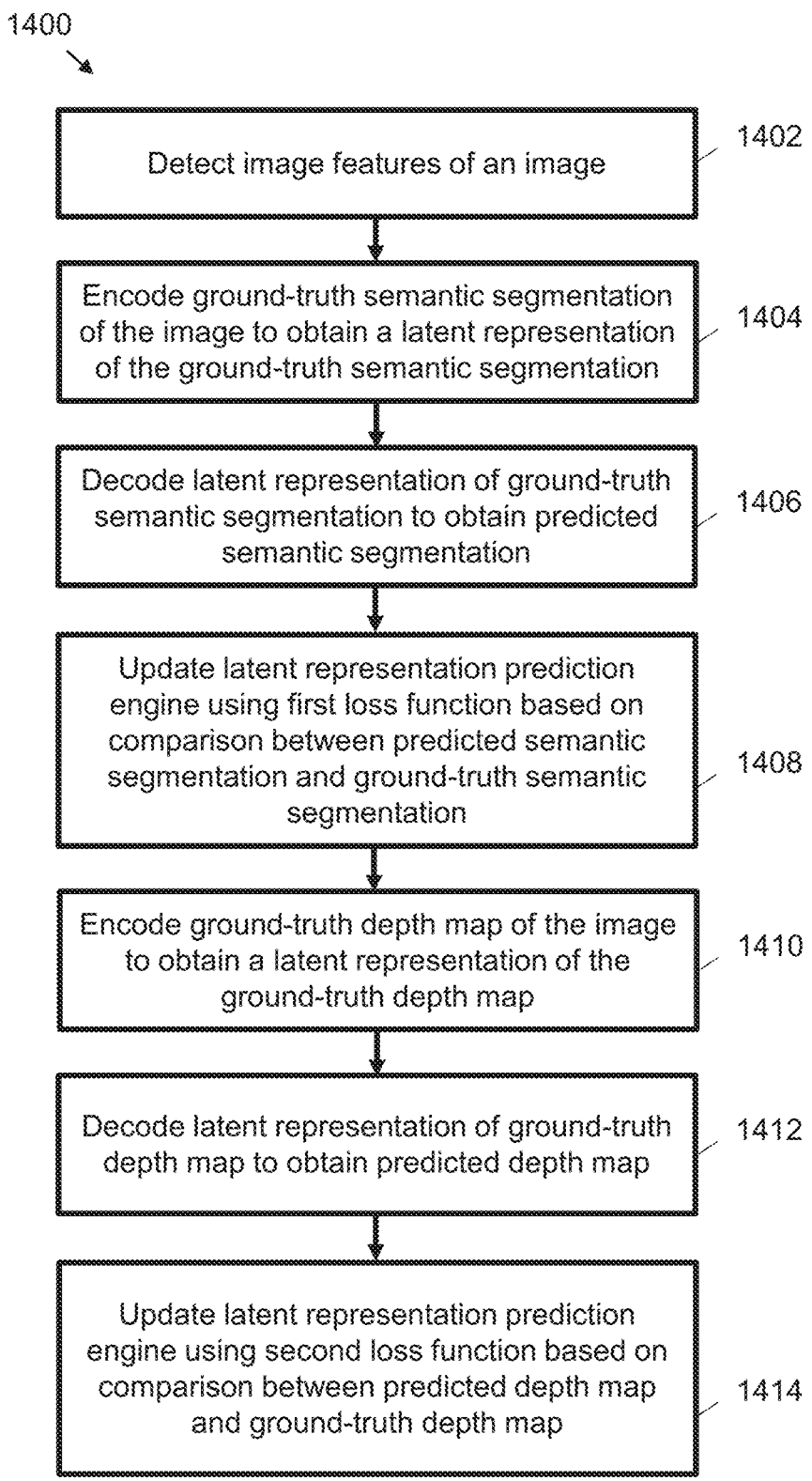
FIG. 14 is a flow diagram showing a method of training a latent representation prediction engine according to further examples.

FIG. 14 is a flow diagram showing a method 1400 of training a latent representation prediction engine according to examples. The method 1400 of FIG. 14 is similar to the method 1300 of FIG. 13 except that the method 1400 of FIG. 14 may be used to train a latent representation prediction engine to predict both a semantic segmentation and a depth map of an input image. The method 1400 of FIG. 14 may be used with the latent representation prediction engine 1200 of FIG. 12, although other engines may be used in other examples. The method 1400 may be performed at a configuration stage, prior to performing the methods of obtaining an optimised latent representation as described herein (which for example use a decoder system which may be trained using the method 1400).

Items 1402 to 1406 of FIG. 14 are the same as items 1302 to 1306 of FIG. 13; corresponding descriptions are to be taken to apply.

Item 1408 of FIG. 14 is similar to item 1308 of FIG. 13. However, the loss function of 1408 is a first loss function in this case, as the method 1400 of FIG. 14 also involves the use of a second loss function (described with reference to item 1414), to train the latent representation prediction engine to predict a depth map.

At item 1410 of FIG. 14, a ground-truth depth map associated with the image (for which the image features are detected at item 1402) is determined. The ground-truth depth map is determined using the encoder system, to obtain a latent representation of the ground-truth depth map. In this case, the encoder system is used to obtain the latent representations of both the ground-truth semantic segmentation and the ground-truth depth map. However, the latent representation of the ground-truth semantic segmentation may be obtained using a first encoder of the encoder system, whereas the latent representation of the ground-truth depth map may be obtained using a second encoder of the decoder system. The first encoder and/or the second encoder may be conditioned on the image features, although need not be.

At item 1412 of FIG. 14, the latent representation of the ground-truth depth map using the decoder system to obtain a predicted depth map for the image. In this case, the decoder system is used to obtain the latent representations of both the ground-truth semantic segmentation and the ground-truth depth map. However, the latent representation of the ground-truth semantic segmentation may be obtained using a first decoder of the decoder system, whereas the latent representation of the ground-truth depth map may be obtained using a second decoder of the decoder system. At least one of the first decoder and the second decoder may be conditioned on the image features.

At item 1414 of FIG. 14, the latent representation prediction engine is updated using a second loss function based on a comparison between the predicted depth map and the ground-truth depth map. As for the first loss function, the second loss function may include a reconstruction term and/or a regularisation term. However, the reconstruction term for example represents a difference between the predicted depth map and the ground-truth depth map. As an example, the following expression may be used as the reconstruction loss, $R_2$, for the second loss function:

$$R_2 = \sum_{i=1}^{N} \left[ \frac{|\tilde{p}_i - p_i|}{b_i} + \log(b_i) \right]$$

where N is the number of pixels in the depth map, $\tilde{p}_i$ is the predicted depth of pixel i, $p_i$ is the ground-truth depth of pixel i, and $b_i$ is the predicted uncertainty of pixel i (e.g. as predicted by the second decoder). However, this is merely an example and other reconstruction terms may be used in other cases.

Items 1410 to 1414 may be repeated for a plurality of samples to determine a set of parameter values for the latent representation prediction engine (e.g. weights associated with a neural network architecture) for the latent representation prediction engine to be able to predict a semantic segmentation from a latent representation associated with a semantic segmentation or a depth map from a latent representation associated with a depth.

In some cases, the latent representation prediction engine may be jointly trained to autoencode a semantic segmentation and a depth map. In such cases, a combined loss function, which is for example a function of the first loss function and the second loss function, may be minimised to update parameter values for the latent representation prediction engine.

The above embodiments are to be understood as illustrative. Further examples are envisaged. It is to be appreciated that the optimised first and second latent representations (or other representations of a scene as described herein) need not be obtained for each frame of a video and may instead be performed for a subset of frames, such as keyframes.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A system for processing image data, the system comprising:
   an input interface to receive the image data, wherein the image data is representative of at least one view of a scene;
   an initialisation engine to generate:
   a first latent representation associated with a first segmentation of at least a first view of the scene, wherein the first segmentation is a semantic segmentation; and
   a second latent representation associated with at least a second view of the scene;
   an optimisation engine to jointly optimise the first latent representation and the second latent representation, in a latent space, to obtain an optimised first latent representation and an optimised second latent representation;
   a feature identification engine arranged to identify image features of the image data at each of a plurality of different resolutions; and
   a decoder system comprising at least one decoder conditioned on the image features, a decoder of the at least one decoder being arranged to:
   produce a decoded output at each of the plurality of different resolutions; and
   for each of the plurality of different resolutions, combine the image features for a given resolution with the decoded output for the given resolution.

2. The system according to claim 1, wherein the decoder system is arranged to at least one of:
   decode the optimised first latent representation to obtain a decoded first representation of the first view of the scene, wherein an optimised first segmentation of the first view of the scene is derivable from the decoded first representation; and
   decode the optimised second latent representation to obtain a decoded second representation of the second view of the scene, wherein an optimised second segmentation of the second view of the scene is derivable from the decoded second representation.

3. The system according to claim 2, wherein the decoder system is arranged to at least one of:
   normalise the decoded first representation to obtain the optimised first segmentation; and
   normalise the decoded second representation to obtain the optimised second segmentation.

4. The system according to claim 2, comprising:
   a tracking system to determine poses of a camera during observation of the scene; and
   a mapping system arranged to populate a map of the scene with at least one of:
   the optimised first segmentation of the first view of the scene and first pose data representative of a first pose of a camera during capture of the first view of the scene; and
   the optimised second segmentation of the second view of the scene and second pose data representative of a second pose of the camera during capture of the second view of the scene.

5. The system according to claim 1, wherein the image data comprises a first frame representing the first view of the scene and a second frame representing the second view of the scene, the first segmentation is a semantic segmentation of the first view of the scene, and the second latent representation is associated with a second segmentation which is a semantic segmentation of the second view of the scene.

6. The system according to claim 5, wherein the optimisation engine is arranged to jointly optimise the first latent representation and the second latent representation by:
   determining a semantic error term indicative of a difference between the first latent representation and the second latent representation; and determining a value of the first latent representation and a value of the second latent representation that minimises the semantic error term.

7. The system according to claim 6, comprising a decoder system arranged to:
decode the first latent representation to obtain a decoded first representation; and
decode the second latent representation to obtain a decoded second representation,
wherein the optimisation engine is arranged to determine the semantic error term using the decoded first representation and the decoded second representation.

8. The system according to claim 5, wherein the initialisation engine is arranged to generate:
a third latent representation associated with a depth map of the first view of the scene; and
a fourth latent representation associated with a depth map of the second view of the scene,
wherein the optimisation engine is arranged to jointly optimise the first, second, third and fourth latent representations in the latent space to obtain the optimised first and second latent representations and optimised third and fourth latent representations.

9. The system according to claim 8, wherein the optimisation engine is arranged to jointly optimise the first, second, third and fourth latent representations by:
determining a semantic error term indicative of a difference between the first latent representation and the second latent representation;
determining a geometric error term indicative of a difference between the third latent representation and the fourth latent representation; and
determining values of the first, second, third and fourth latent representations, respectively, that jointly minimise the semantic error term and the geometric error term to obtain optimised first, second, third and fourth latent representations.

10. The system according to claim 8, wherein the optimisation engine is arranged to:
determine a photometric error term indicative of a photo-consistency between the first view of the scene and the second view of the scene; and
determine respective values of at least one of the first, second, third and fourth latent representations that minimise the photometric error term.

11. The system according to claim 1, wherein the first segmentation is the semantic segmentation of the first view of the scene, and the second latent representation is associated with a depth map for the second view of the scene.

12. A robotic device comprising:
the system according to claim 1;
one or more actuators to enable the robotic device to interact with a surrounding three-dimensional environment, wherein at least a portion of the surrounding three-dimensional environment is shown in the scene; and
an interaction engine comprising at least one processor to control the one or more actuators.

13. A method of processing image data, the method comprising:
obtaining a first latent representation associated with a first segmentation of a first view of a scene represented by the image data, wherein the first segmentation is a semantic segmentation;
obtaining a second latent representation associated with a second view of the scene;
jointly optimising the first latent representation and the second latent representation in a latent space to obtain an optimised first latent representation and an optimised second latent representation;
identifying image features of the image data at each of a plurality of different resolutions;
producing a decoded output, at each of the plurality of different resolutions; and
combining, for each of the plurality of different resolutions, the image features for a given resolution with the decoded output for the given resolution.

14. The method according to claim 13, wherein the image data comprises a first frame representing the first view of a scene and a second frame representing the second view of the scene, the first segmentation is a semantic segmentation of the first view of the scene, and the second latent representation is associated with a second segmentation which is a semantic segmentation of the second view of the scene.

15. The method according to claim 14, comprising:
obtaining a third latent representation associated with depth data for the scene;
obtaining a fourth latent representation associated with depth data for the scene; and
jointly optimising the first, second, third and fourth latent representations in the latent space to obtain the optimised first and second latent representations and an optimised third and fourth representation.

16. The system of claim 1, wherein the initialisation engine is trained to predict a semantic segmentation of an input image using a method comprising:
detecting image features of an image;
encoding a ground-truth semantic segmentation of the image using an encoder of an autoencoder to obtain a latent representation of the ground-truth semantic segmentation;
decoding the latent representation of the ground-truth semantic segmentation using a decoder of the autoencoder to obtain a predicted semantic segmentation of the image, wherein the autoencoder is conditioned using the image features; and
updating the latent representation prediction engine using a loss function based on a comparison between the predicted semantic segmentation of the image and the ground-truth semantic segmentation of the image.

17. A system for processing image data, the system comprising:
an input interface to receive the image data, wherein the image data is representative of at least one view of a scene;
an initialisation engine to generate:
a first latent representation associated with a first segmentation of at least a first view of the scene, wherein the first segmentation is a semantic segmentation; and
a second latent representation associated with at least a second view of the scene;
an optimisation engine to jointly optimise the first latent representation and the second latent representation, in a latent space, to obtain an optimised first latent representation and an optimised second latent representation;
a tracking system to determine poses of a camera during observation of the scene; and
a mapping system arranged to populate a map of the scene with at least one of:
an optimised first segmentation of the first view of the scene and first pose data representative of a first pose of a camera during capture of the first view of the scene, wherein the optimised first segmentation is derivable from a decoded first representation of the optimised first latent representation; and an optimised second segmentation of the second view of the scene and second pose data representative of a second pose of the camera during capture of the second view of the scene, wherein the optimised second segmentation is derivable from a decoded second representation of the optimised second latent representation.

18. The system according to claim 17, wherein the image data comprises a first frame representing the first view of the scene and a second frame representing the second view of the scene, the first segmentation is a semantic segmentation of the first view of the scene, and the second latent representation is associated with a second segmentation which is a semantic segmentation of the second view of the scene.

19. The system according to claim 18, wherein the initialisation engine is arranged to generate:

a third latent representation associated with a depth map of the first view of the scene; and a fourth latent representation associated with a depth map of the second view of the scene, wherein the optimisation engine is arranged to jointly optimise the first, second, third and fourth latent representations in the latent space to obtain the optimised first and second latent representations and optimised third and fourth latent representations.

20. The system according to claim 19, wherein the optimisation engine is arranged to:

determine a photometric error term indicative of a photo-consistency between the first view of the scene and the second view of the scene; and determine respective values of at least one of the first, second, third and fourth latent representations that minimise the photometric error term.

* * * * *